(12) United States Patent
Strom et al.

(10) Patent No.: US 10,286,611 B2
(45) Date of Patent: May 14, 2019

(54) SELECTABLE DRIVE SYSTEM

(71) Applicant: Hewlett-Packard Development Company, L.P., Houston, TX (US)

(72) Inventors: Eric Berner Strom, Canby, WA (US); John J Contrell, Camas, WA (US); Sierra Lynn Wolf, Vancouver, WA (US); Josh Dankovchik, Vancouver, WA (US); Robert De La O, Vancouver, WA (US); Bill Fournier, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/763,044

(22) PCT Filed: Jan. 11, 2016

(86) PCT No.: PCT/US2016/012887
§ 371 (c)(1),
(2) Date: Mar. 23, 2018

(87) PCT Pub. No.: WO2017/123200
PCT Pub. Date: Jul. 20, 2017

(65) Prior Publication Data
US 2018/0304554 A1 Oct. 25, 2018

(51) Int. Cl.
*B41J 2/165* (2006.01)
*B41J 29/38* (2006.01)
(Continued)

(52) U.S. Cl.
CPC ............. *B29C 67/24* (2013.01); *B29C 67/00* (2013.01); *B33Y 30/00* (2014.12); *B33Y 40/00* (2014.12);
(Continued)

(58) Field of Classification Search
CPC . B41J 2/16511; B41J 3/36; B41J 29/38; B41J 23/025
(Continued)

(56) References Cited

U.S. PATENT DOCUMENTS 8,152,269 B2 * 4/2012 Takeuchi ............. B41J 2/16532
347/32
2007/0126168 A1 6/2007 Silverbrook et al.
(Continued)

FOREIGN PATENT DOCUMENTS

CN 1511705 7/2004
CN 101115112 1/2008
(Continued)

Primary Examiner — An H Do
(74) Attorney, Agent, or Firm — Fabian VanCott

(57) ABSTRACT

A printing device includes a carriage slidably mounted on a carriage rail, the carriage to move along the carriage rail, and a selectable drive system includes a capping system to cap a number of pens coupled to the carriage, a scan drive system to drive components of a scanning device associated with the printing device, a drive selector assembly to select between driving the capping system to a printing system drive position or driving the scan drive system depending on a position of a selector swing arm of the drive selector assembly, and a shifter to selectively shift the drive selector assembly between a scanning system drive position of the selector swing arm and a printing system drive position of the selector swing arm.

15 Claims, 19 Drawing Sheets

(51) Int. Cl.
*B41J 3/36* (2006.01)
*B29C 67/00* (2017.01)
*B29C 67/24* (2006.01)
*B41J 23/02* (2006.01)
*H04N 1/04* (2006.01)
*B33Y 30/00* (2015.01)
*B33Y 40/00* (2015.01)

(52) U.S. Cl.
CPC ....... *B41J 2/16508* (2013.01); *B41J 2/16511* (2013.01); *B41J 3/36* (2013.01); *B41J 23/025* (2013.01); *B41J 29/38* (2013.01); *H04N 1/04* (2013.01); *H04N 1/0423* (2013.01)

(58) Field of Classification Search
USPC ............................................. 347/20, 29, 32
See application file for complete search history.

(56) References Cited

U.S. PATENT DOCUMENTS

| 2007/0273717 | A1 | 11/2007 | Tsai et al. |
| 2009/0174733 | A1 | 7/2009 | Balcan |
| 2010/0157328 | A1 | 6/2010 | Hoshino |

FOREIGN PATENT DOCUMENTS

| CN | 101357547 | | 2/2009 |
| EP | 0955168 | A1 | 11/1999 |

\* cited by examiner

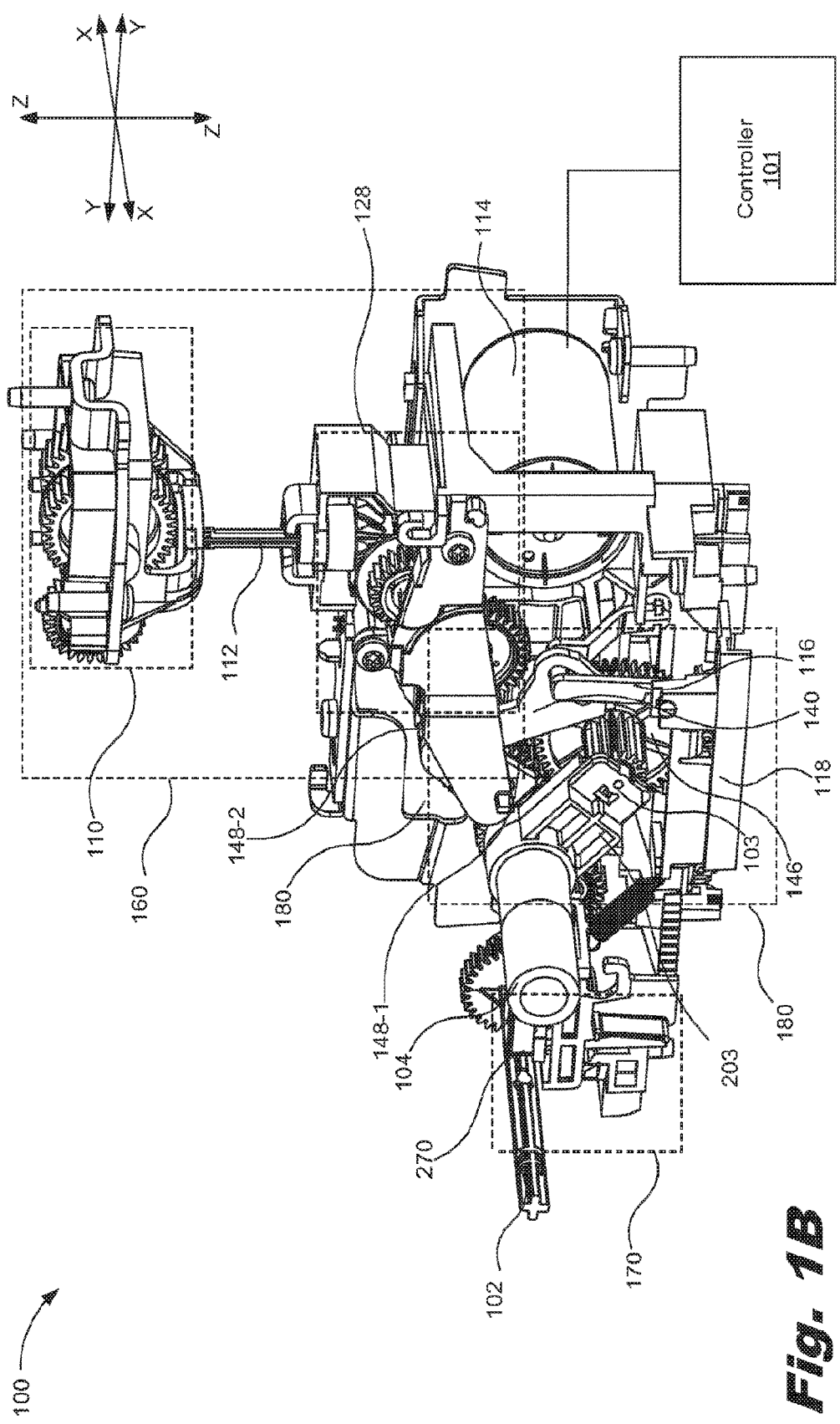

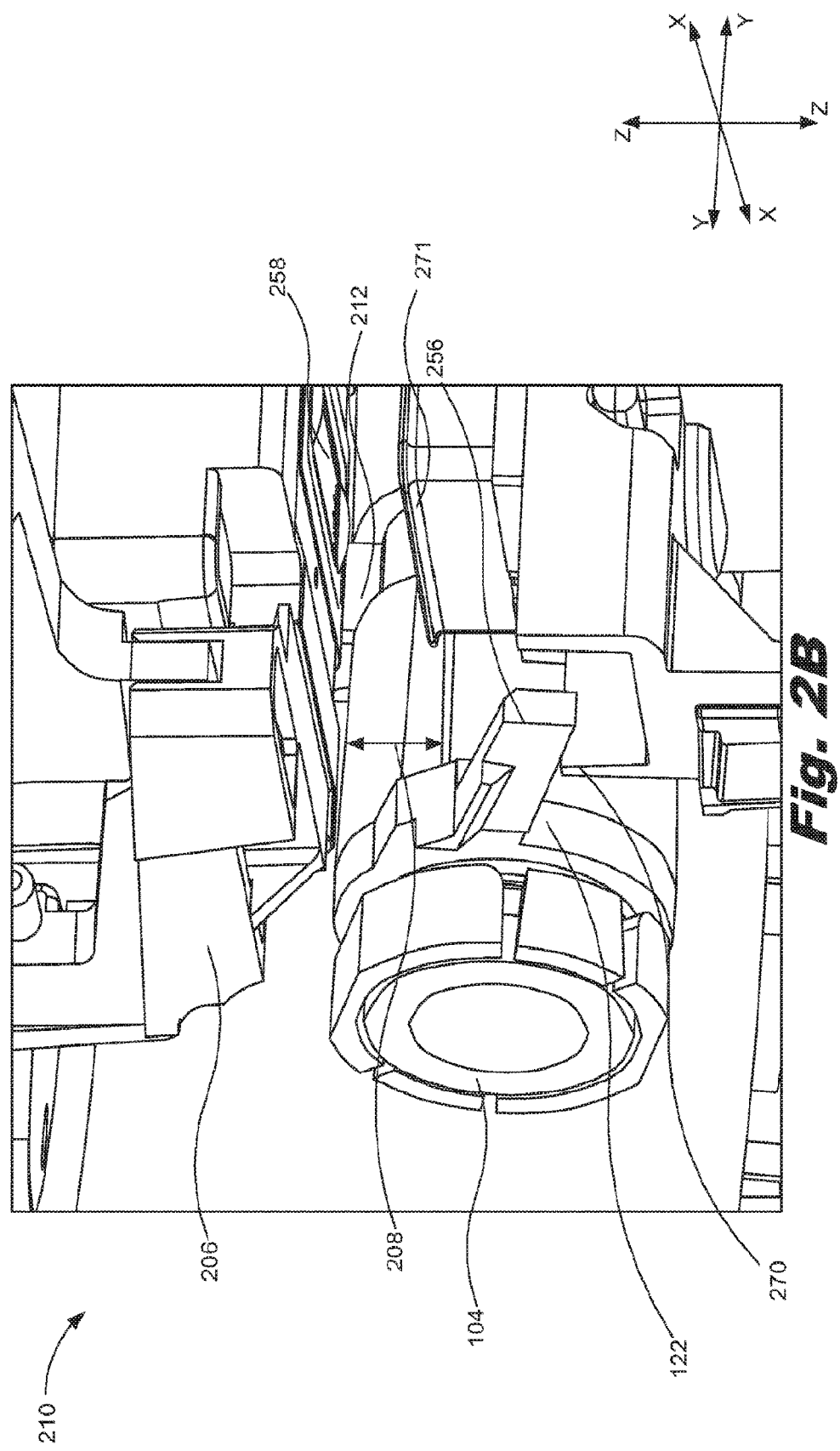

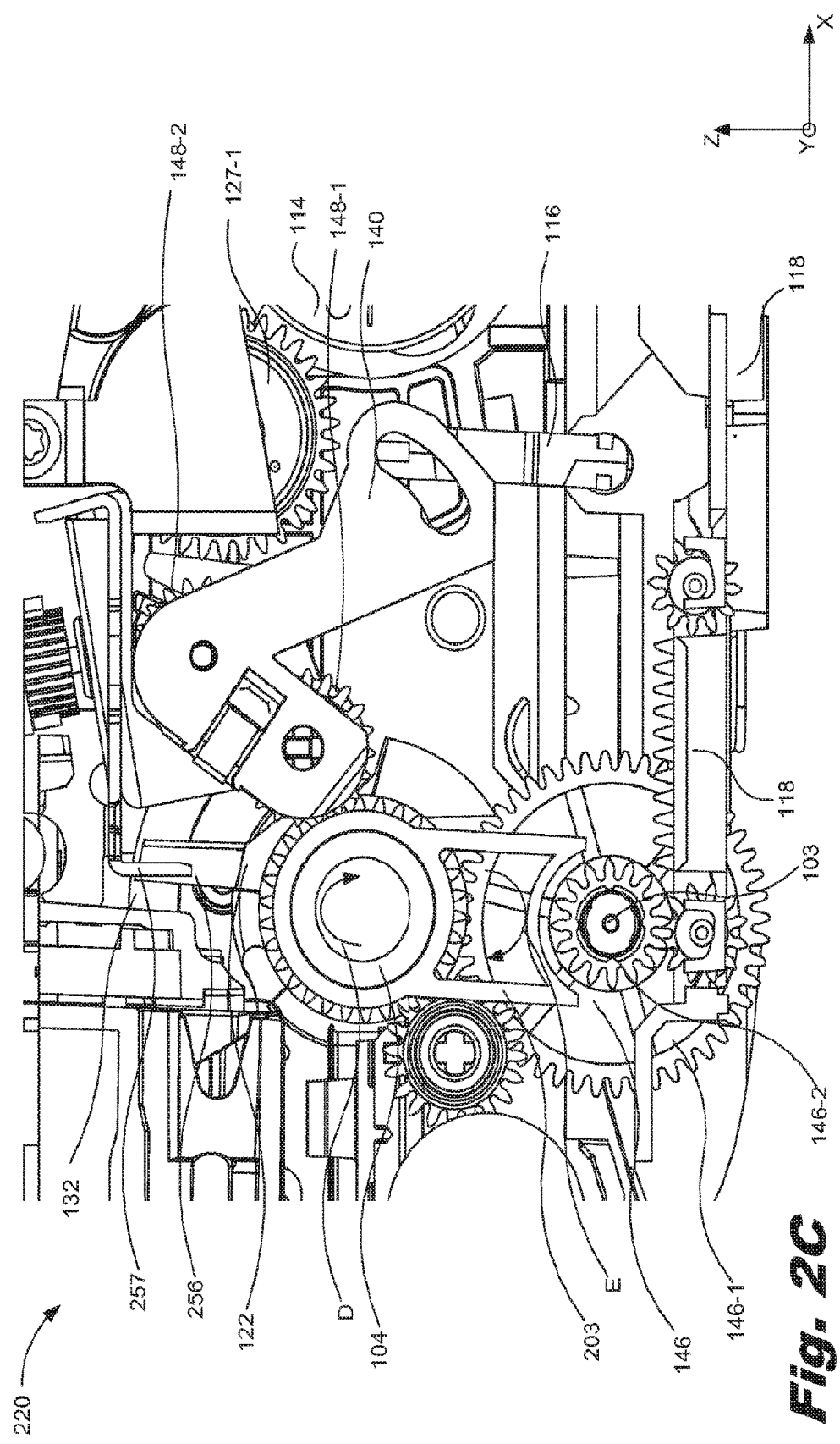

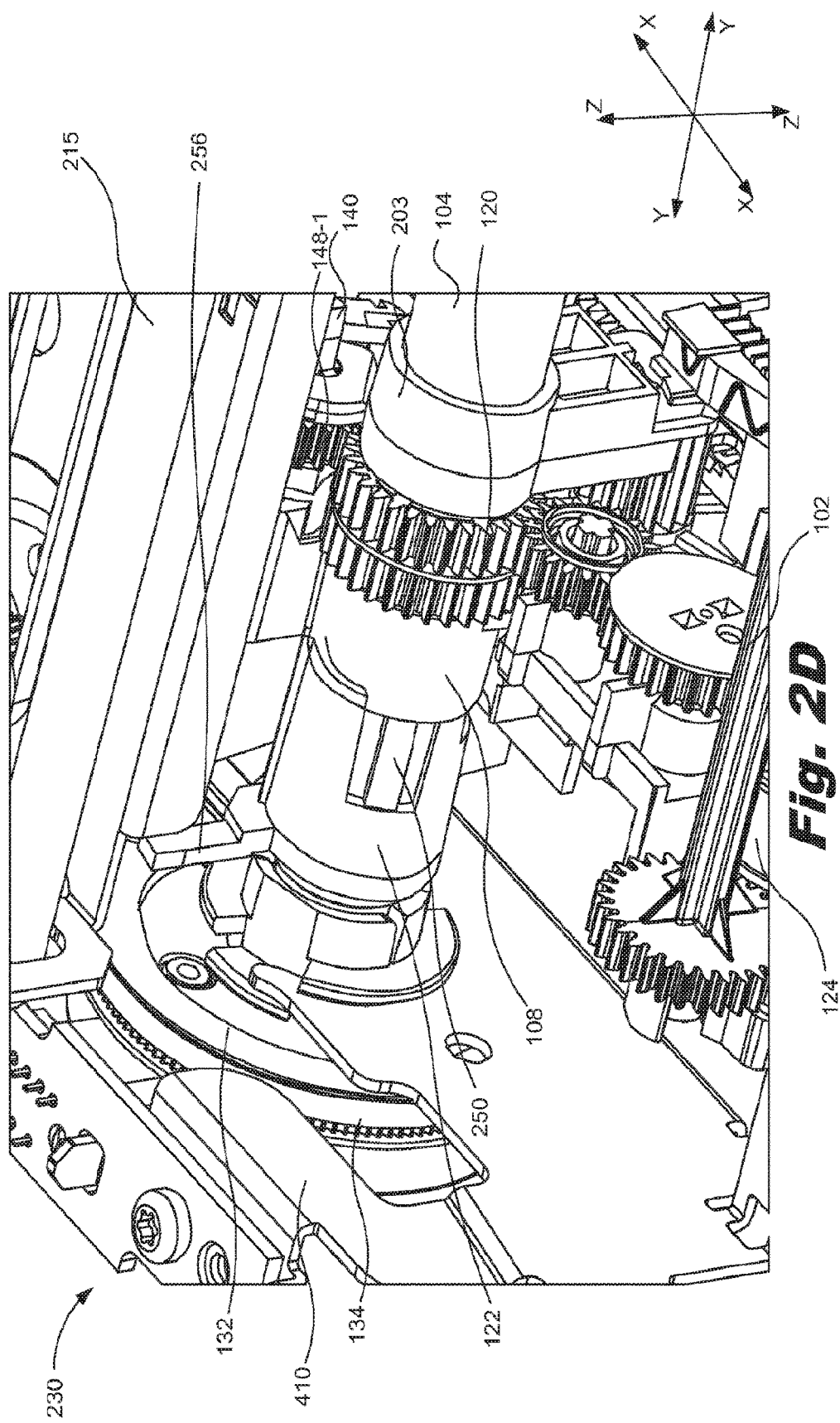

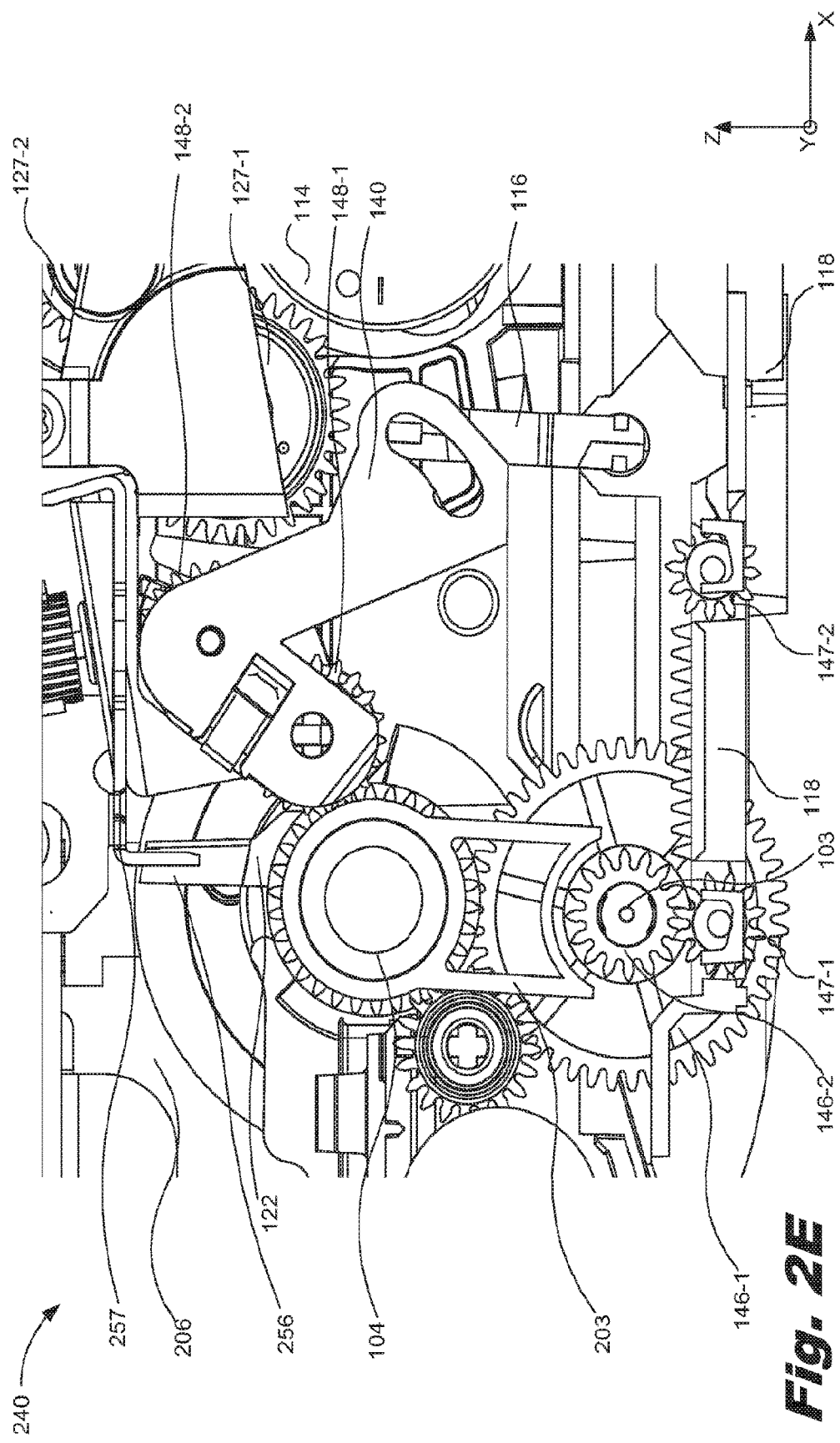

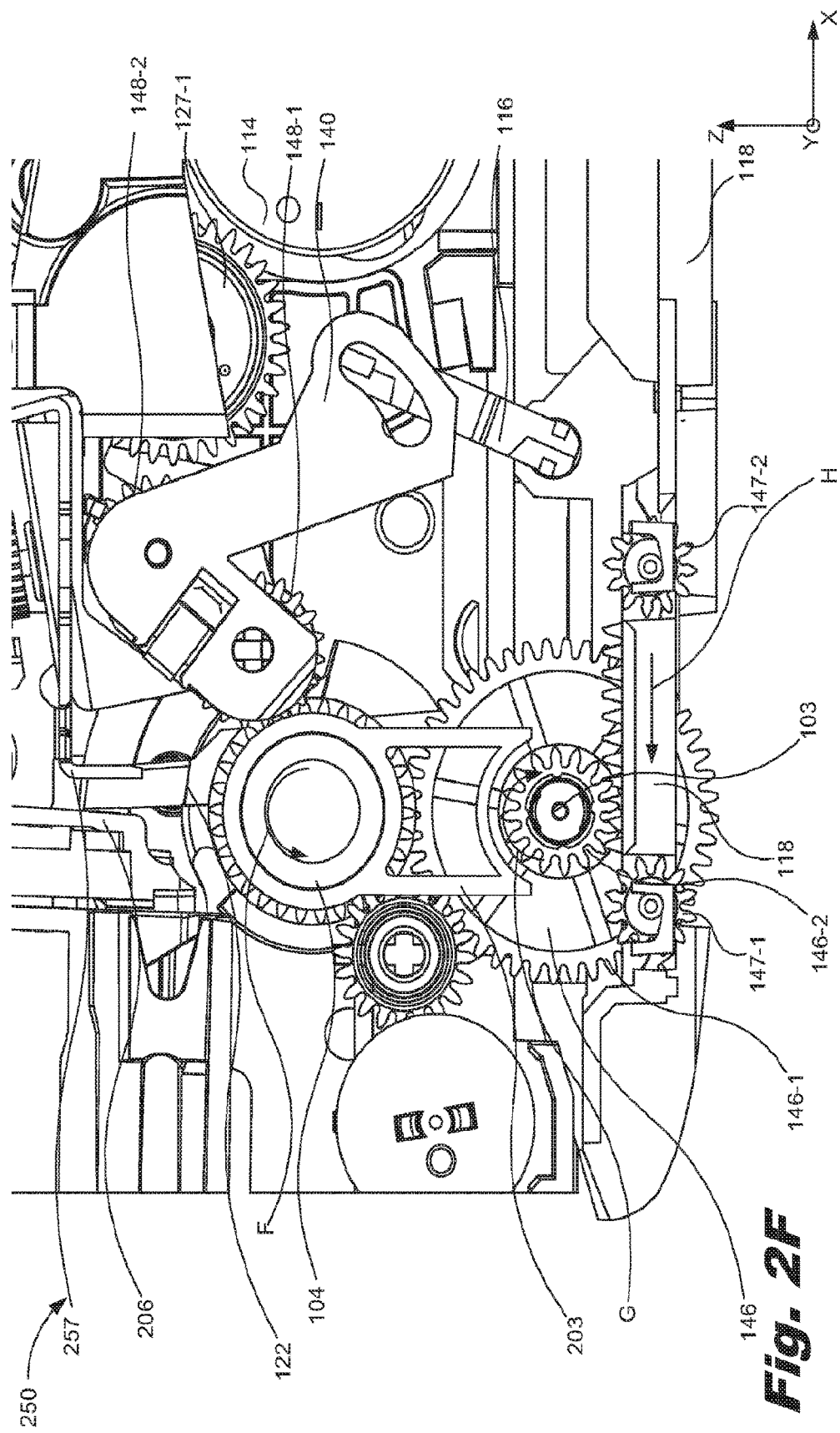

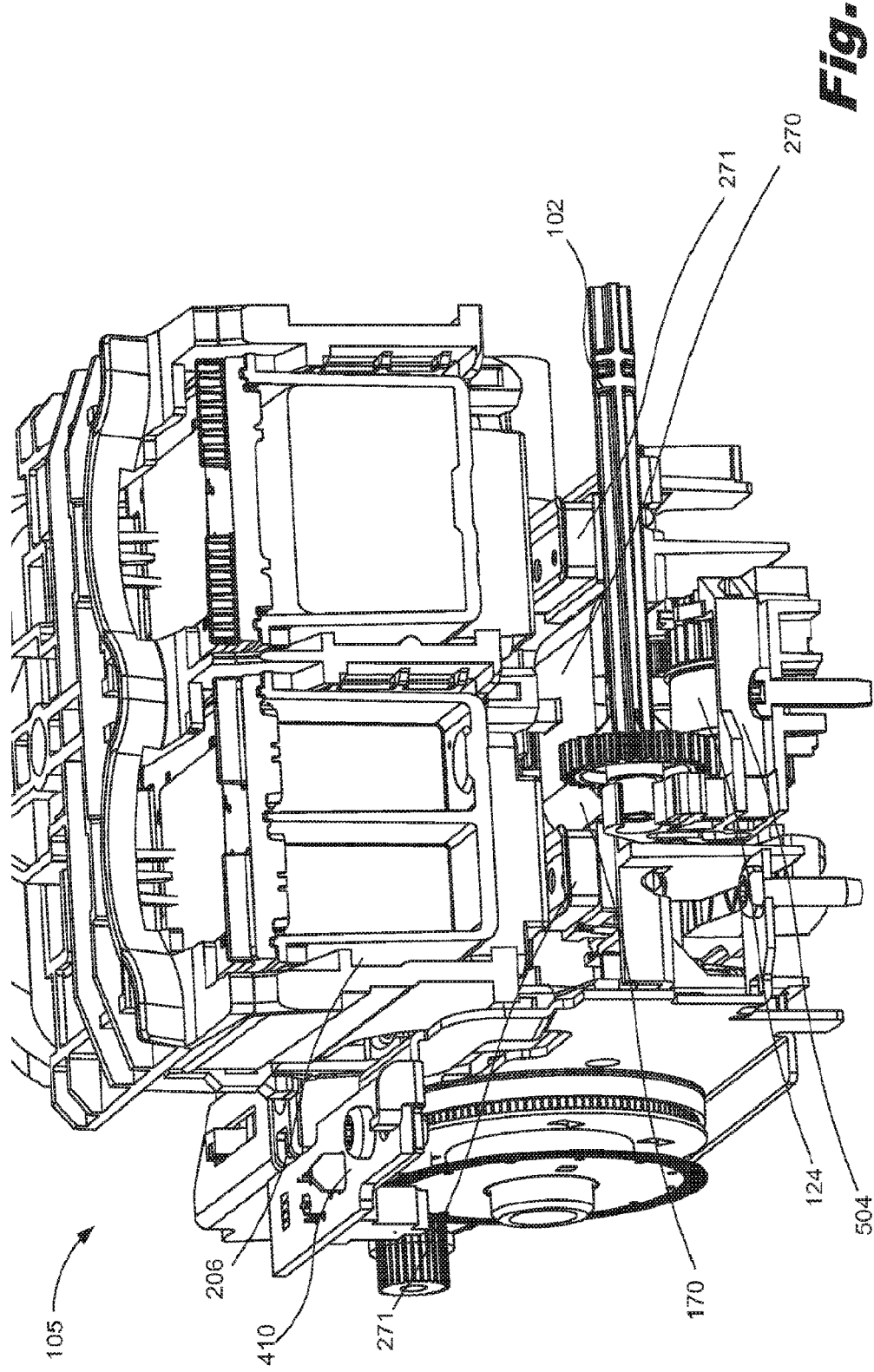

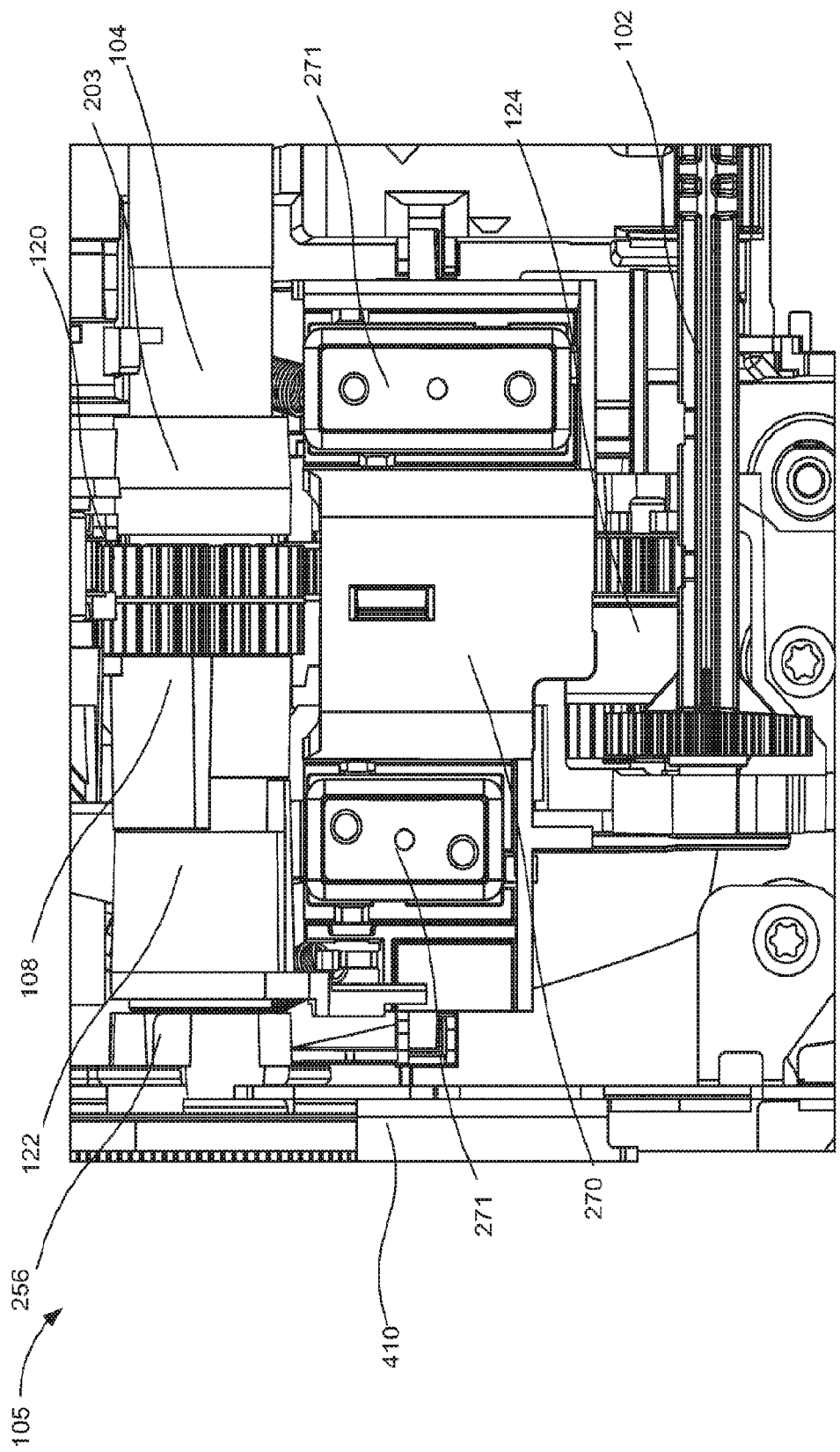

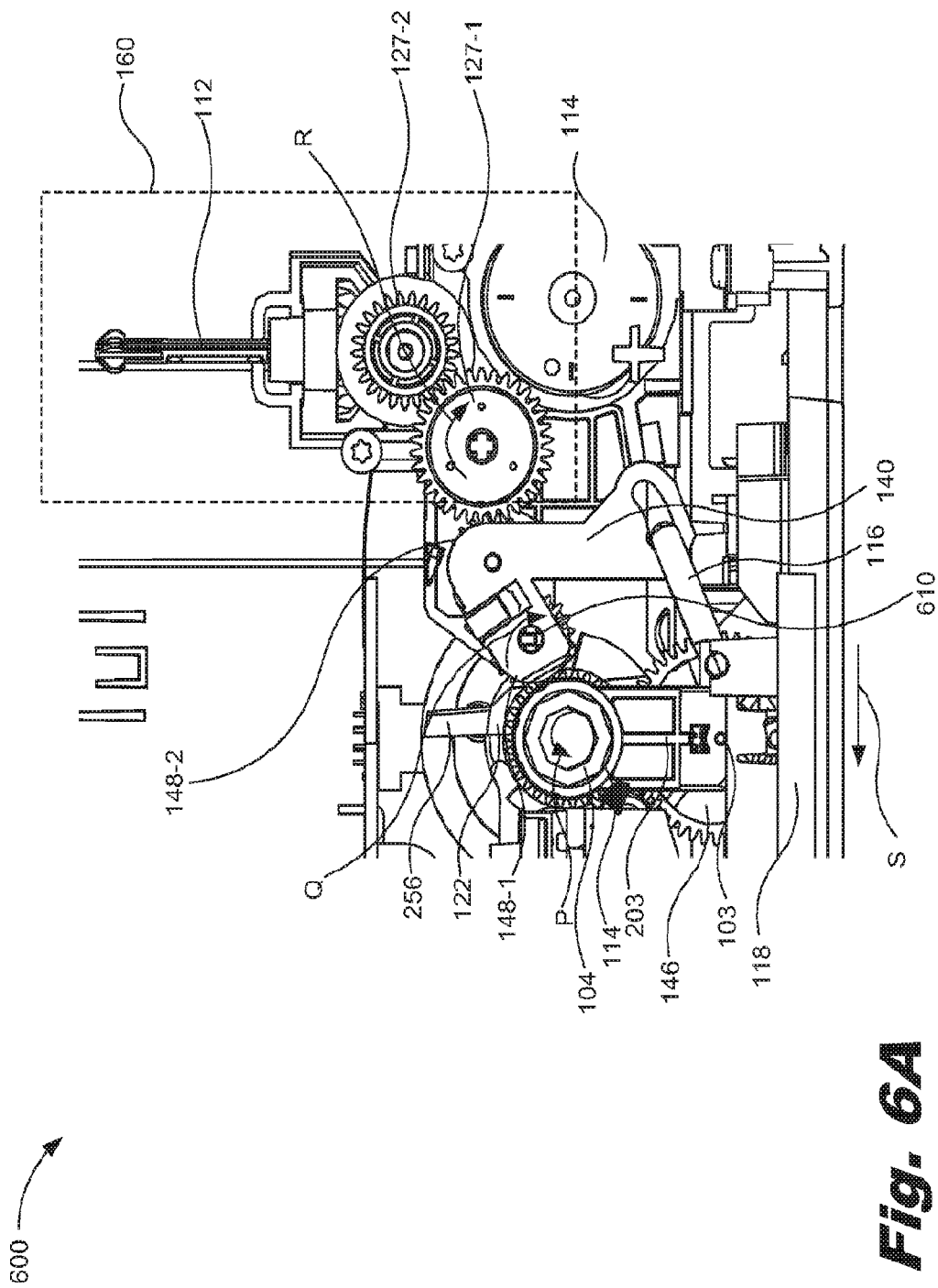

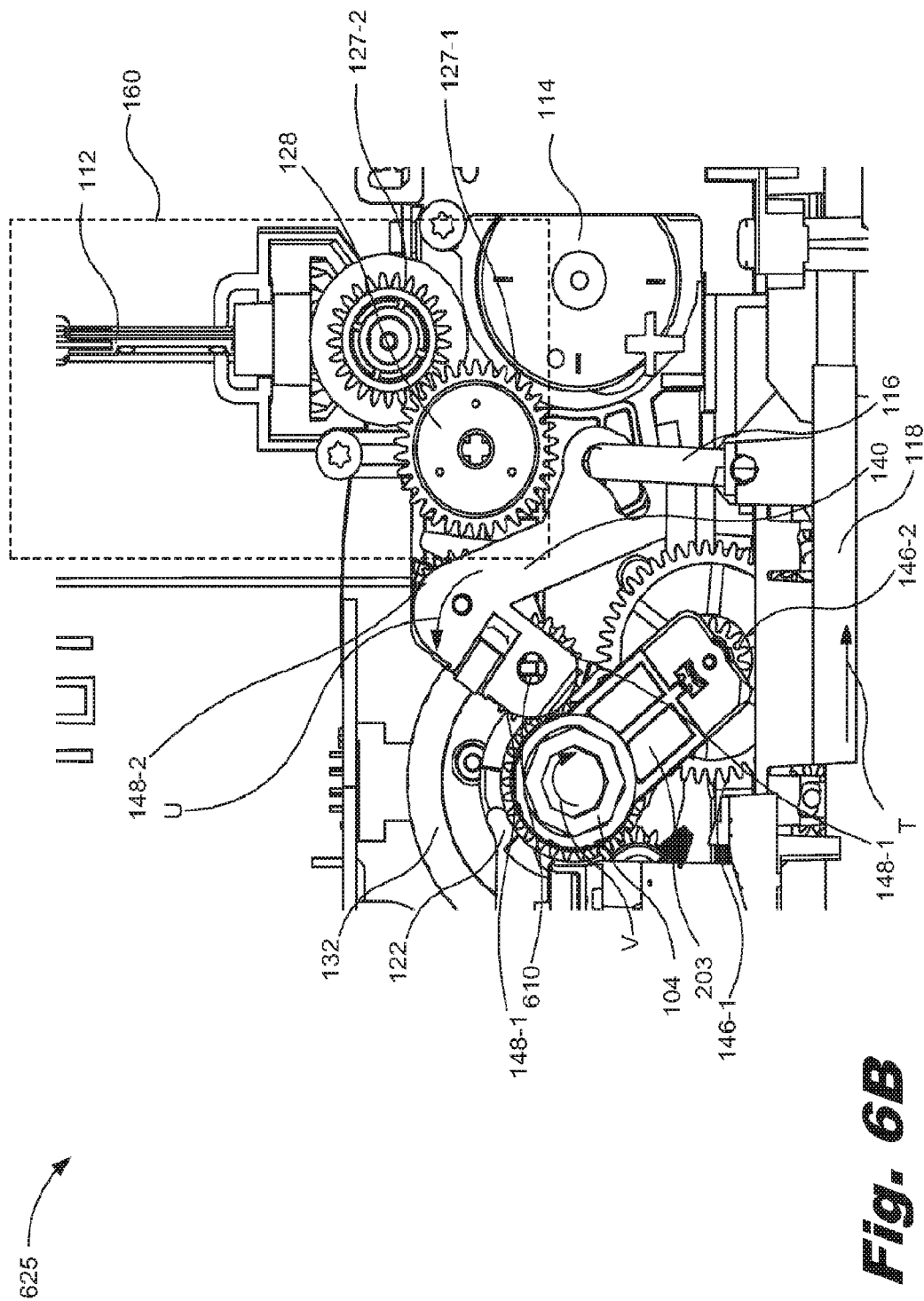

SELECTABLE DRIVE SYSTEM

BACKGROUND

Printing devices provide a user with a hardcopy of a document by printing a representation of the document from digital data onto a print medium. The printing device, such as a two dimensional (2D) printing device, includes a number of components such as a carriage with a number of pens. The pens are coupled to the carriage and are used to eject printing fluid or other printable material onto the print medium to form an image. The carriage moves along a carriage rail via a motor to eject the printing fluid onto the print medium to form the image. Further, the printing device may be a 3 dimensional (3D) printing device. The 3D printing device uses pens to print on a bed of build material to create a 3D object.

BRIEF DESCRIPTION OF THE DRAWINGS

The accompanying drawings illustrate various examples of the principles described herein and are a part of the specification. The examples do not limit the scope of the claims.

FIG. 1B is an isometric view of a selectable drive system, according to one example of principles described herein.

FIG. 2B is an isometric view of the selectable drive system illustrating a clearance between a shifter and pens, according to one example of principles described herein.

FIG. 2C is an isometric view of the selectable drive system preparing to cap, according to one example of principles described herein.

FIG. 2D is an isometric view of the selectable drive system preparing to cap, according to one example of principles described herein.

FIG. 2E is a cutaway side view of the selectable drive system preparing to cap, according to one example of principles described herein.

FIG. 2F is a cutaway side view of the selectable drive system preparing to cap, according to one example of principles described herein.

FIG. 5A is an isometric view of components of the selectable drive system, according to one example of principles described herein.

FIG. 5B is an isometric view of components of the selectable drive system, according to one example of principles described herein.

FIG. 6A is a cutaway side view of a scan drive system in a scanning system drive position, according to one example of principles described herein.

FIG. 6B is a cutaway side view of the scan drive system in the printing system drive position, according to one example of principles described herein.

Throughout the drawings, identical reference numbers designate similar, but not necessarily identical, elements.

DETAILED DESCRIPTION

Figure 1A:
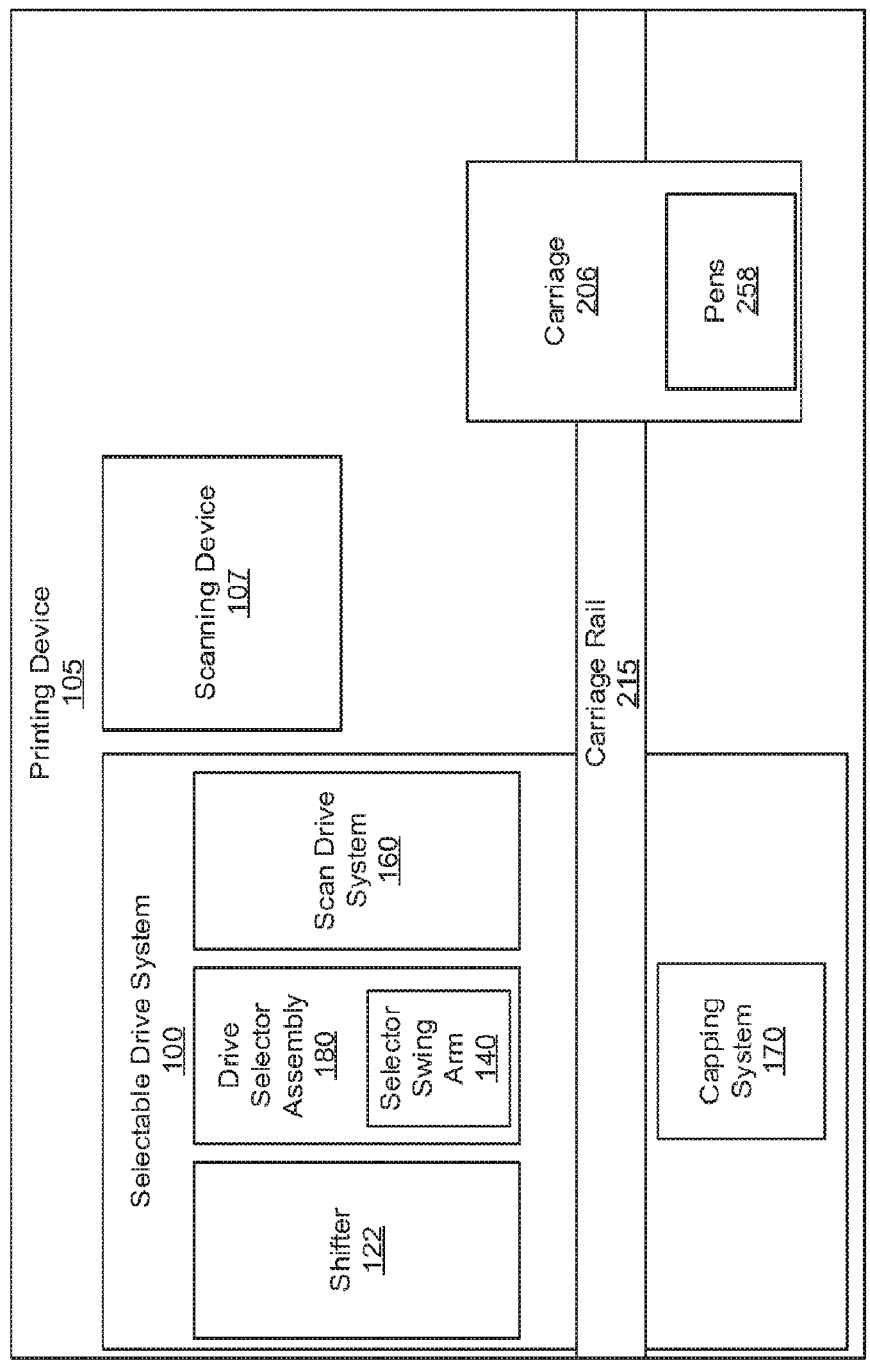
FIG. 1A is a block diagram of a printing device, according to one example of principles described herein.

As mentioned above, printing devices provide a user with a physical copy of a document by printing an image of the document onto a print medium. The printing device often includes a number of components, such as a number of pens coupled to a carriage, a scanning device, and a feedshaft to feed the print medium through the printing device. Each of these components is driven by motors. For example, a carriage motor drives the carriage back and forth along a carriage rail. A feedshaft motor drives the feedshaft such that the print medium is feed through the printing device as the pens of the carriage deposit drops of ink on the print medium. A scanning device motor drives a scanning device of the printing device. A capping motor drives a capping system to cap and uncap the pens of the printing device. Each of these motors contributes to the overall size and weight of the printing device.

Often, consumers purchase printing devices based on the portability of the printing device. For example, some consumers need a printing device to be portable such that the printing device can be easily transported from one location to another location. A factor that influences the portability of the printing device is the overall size of the printing device. The overall size of the printing device includes a length, a height, and a width of the printing device. If the printing device's overall size is too large to suit a consumer's needs with regard to portability, the consumer may decide not to purchase the printing device. As a result, consumers decide whether or not to purchase a printing device based on the overall size of the printing device. Another factor that influences the portability of the printing device is the weight of the printing device. In some examples, the more components a printing device includes, the higher the weight of the printing device. If the weight of the printing device is substantial such that the printing device cannot be easily transported from one location to another location, a consumer may decide not to purchase the printing device. As a result, the consumers decide whether or not to purchase a printing device based on the weight of the printing device. If the portability of the printing device is undesirable, the consumer may decide not to purchase the printing device resulting in unsold printing devices. This causes the manufacture's and/or the distributor's sales for the printing device to decrease due to the unsold printing devices.

The examples described herein provide a printing device. The printing device includes a carriage slidably mounted on a carriage rail. The carriage moves along the carriage rail. The printing device also includes a selectable drive system that includes a capping system to cap a number of pens coupled to the carriage. A scan drive system drives components of a scanning device associated with the printing device, and a drive selector assembly selects between driving the capping system to a printing system drive position or driving the scan drive system depending on a position of a selector swing arm of the drive selector assembly. The printing device further includes a shifter to selectively shift the drive selector assembly between a scanning system drive position of the selector swing arm and a printing system drive position of the selector swing arm. Such a printing device is compact and uses a single motor to drive components of a scanning device and components to cap and uncap pens of a printing device. As a result, by eliminating a motor to drive components of a scanning device and another motor to drive components of a capping system, the overall size of the printing device is reduced.

In the present specification and in the appended claims, the term "selectable drive system" means a number of components associated with a printing device. Specifically, the selectable drive system includes a scan drive system, a capping system, and a drive selector assembly. The selectable drive system uses a single motor to drive these systems.

In the present specification and in the appended claims, the term "scan drive system" means a mechanism used to drive components of a scanning device associated with a printing device. The scan drive system includes a set of bevel gears, a power take off (PTO) shaft, and a set of worm gears.

In the present specification and in the appended claims, the term "capping system" means a mechanism used to cap a number of pens coupled to a carriage. The capping system is any device that humidically seals the nozzles of the pens from contaminants and drying when the printing device is not being used to print images on print media. The capping system includes a ramp and a capping assembly.

In the present specification and in the appended claims, the term "drive selector assembly" means a component of the selectable drive system. The drive selector assembly selects between driving the capping system to an uncapped position or driving the scan drive system depending on a position of a selector swing arm of the drive selector assembly.

In the present specification and in the appended claims, the term "shifter" means a component of a selectable drive system to selectively shift the drive selector assembly between two positions. The positions include a scanning system drive position and a printing system drive position.

Further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Referring now to the figures, FIG. 1A is a block diagram of a printing device, according to one example of principles described herein. In one example, the printing device (105) provides a user with a hardcopy of a document by printing a representation of the document from digital data onto a print medium. As illustrated, the printing device (105) includes a carriage (206). The carriage (206) is slidably mounted on a carriage rail (215). The carriage (206) can move along the carriage rail (215) as directed by a carriage motor.

The printing device (105) includes a selectable drive system (100). The selectable drive system (100) uses a motor (114) to drive a number of components associated with the printing device (105). These components include 1) a capping system (170) to cap a number of pens (258) coupled to the carriage (206), 2) a scan drive system (160) to drive components of a scanning device (107) associated with the printing device (105), 3) a drive selector assembly (180) to select between driving the capping system (170) to a uncapped position or driving the scan drive system (160) depending on a position of a selector swing arm (140) of the drive selector assembly (180), and 4) a shifter (122) to selectively shift the drive selector assembly (180) between a scanning system drive position of the selector swing arm (140) and a printing system drive position of the selector swing arm (140). More information about the components of the printing device (105) will be described below.

Figure 1C:
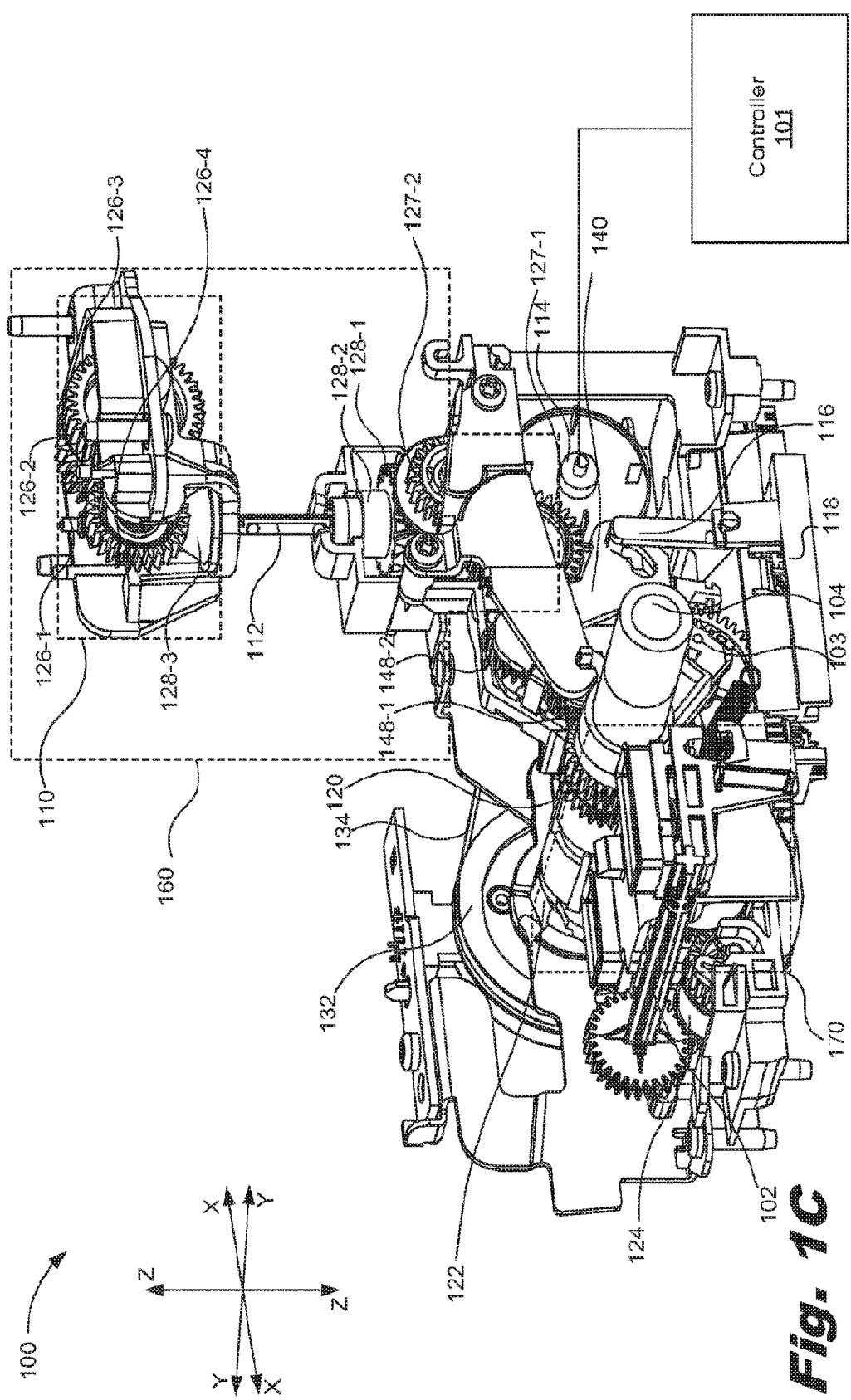
FIG. 1C is an isometric view of the selectable drive system, according to one example of principles described herein.

FIGS. 1B and 1C are isometric views of a selectable drive system (100), according to one example of principles described herein. In one example, a selectable drive system (100) is a mechanism used to drive components of a printing device (105). Specifically, the selectable drive system (100) includes a capping system (170), a scan drive system (160), and a drive selector assembly (180). The selectable drive system (100) uses a single motor (114) to drive these systems (160, 170, and 180). As described below, the capping system (170), the scan drive system (160) and the drive selector assembly (180) include a number of components.

The selectable drive system (100) includes the motor (114). The motor (114) is rotatably connected to a feedshaft (104) to drive the selectable drive system (100). In one example, the motor (114) may be rotatably coupled to the feedshaft (104) via a number of belts, gears, or combinations thereof so that the orientation of the motor (114) relative to the feedshaft (104) is not required to be linear.

Further, the motor (114) is used to drive components of the scan drive system (160), the capping system (170), and the drive selector assembly (180) of the selectable drive system (100) via its rotation of the feedshaft (104). In this manner, these systems (160, 170, 180) are indirectly driven by the motor (114) since the feedshaft (104) is, instead, in direct contact with, and provides rotational motion to at least one component of these systems (160, 170, 180). To drive these systems (160, 170, and 180), the motor (114) applies a torque in a forward direction or a reverse direction at a number of speeds and for a number of different durations as instructed by a controller (101). As described in FIG. 1C, a drive shaft of the motor (114) may be connected to the feedshaft (104) via a pulley (132) and belt (134). As a result, as the motor (114) rotates, so does the feedshaft (104). This allows the motor (114) to apply a torque to the feedshaft (104) and the feedshaft (104), in turn, provides the torque to the components of the capping system (170), the scan drive system (160), and/or the drive selector assembly (180).

The selectable drive system (100) includes the feedshaft (104). The feedshaft (104) is used to drive print medium through the printing device (105) while the printing device (105) is printing or scanning a document. As will be described below, a number of components, such as a drive swing arm (108), a bearing (203), a shifter (122), and feedshaft drive gear (120) are mounted to on the feedshaft (104). The drive swing arm (108), the bearing (203), and the shifter (122) are rotationally secured to the feedshaft (104).

As a result, as the feedshaft (104) rotates, the drive swing arm (108) and the shifter (122) rotate to specific positions. The bearing (203) and the feedshaft drive gear (120) are secured to the feedshaft (104) such that the bearing (108) and the feedshaft drive gear (120) rotate with the feedshaft (104).

The selectable drive system (100) includes an output shaft (102). The output shaft (102) is used to drive the printing media out of the printing device (105) and into, for example, an output tray at the last stage of printing. The output shaft (102) is connected to the feedshaft (104) via a one-way clutch (124). The interaction of the one-way clutch (124), the output shaft (102), and other elements within the selectable drive system (100) will be described in more detail below.

Figure 2A:
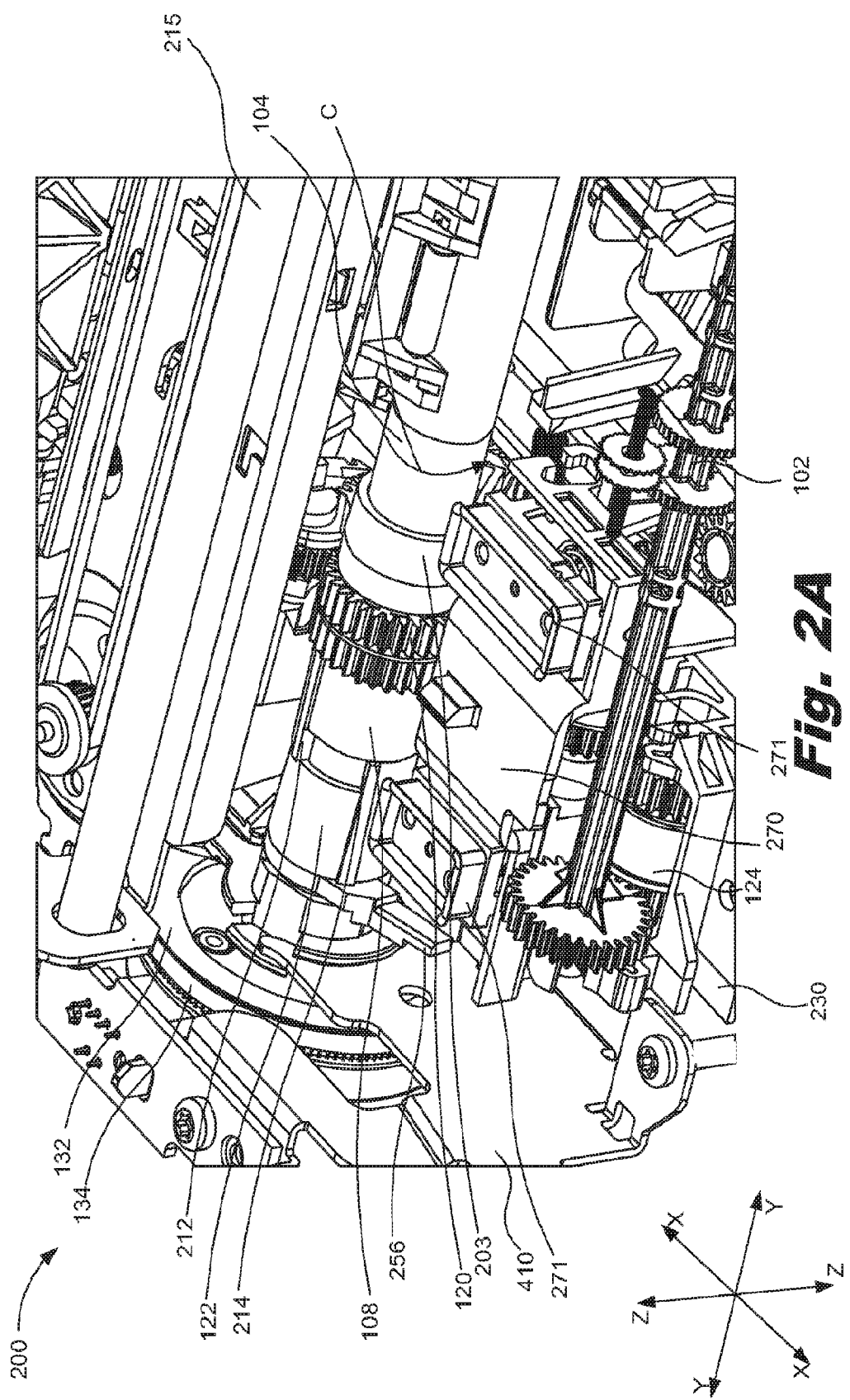
FIG. 2A is an isometric view of the selectable drive system, according to one example of principles described herein.
Figure 2G:
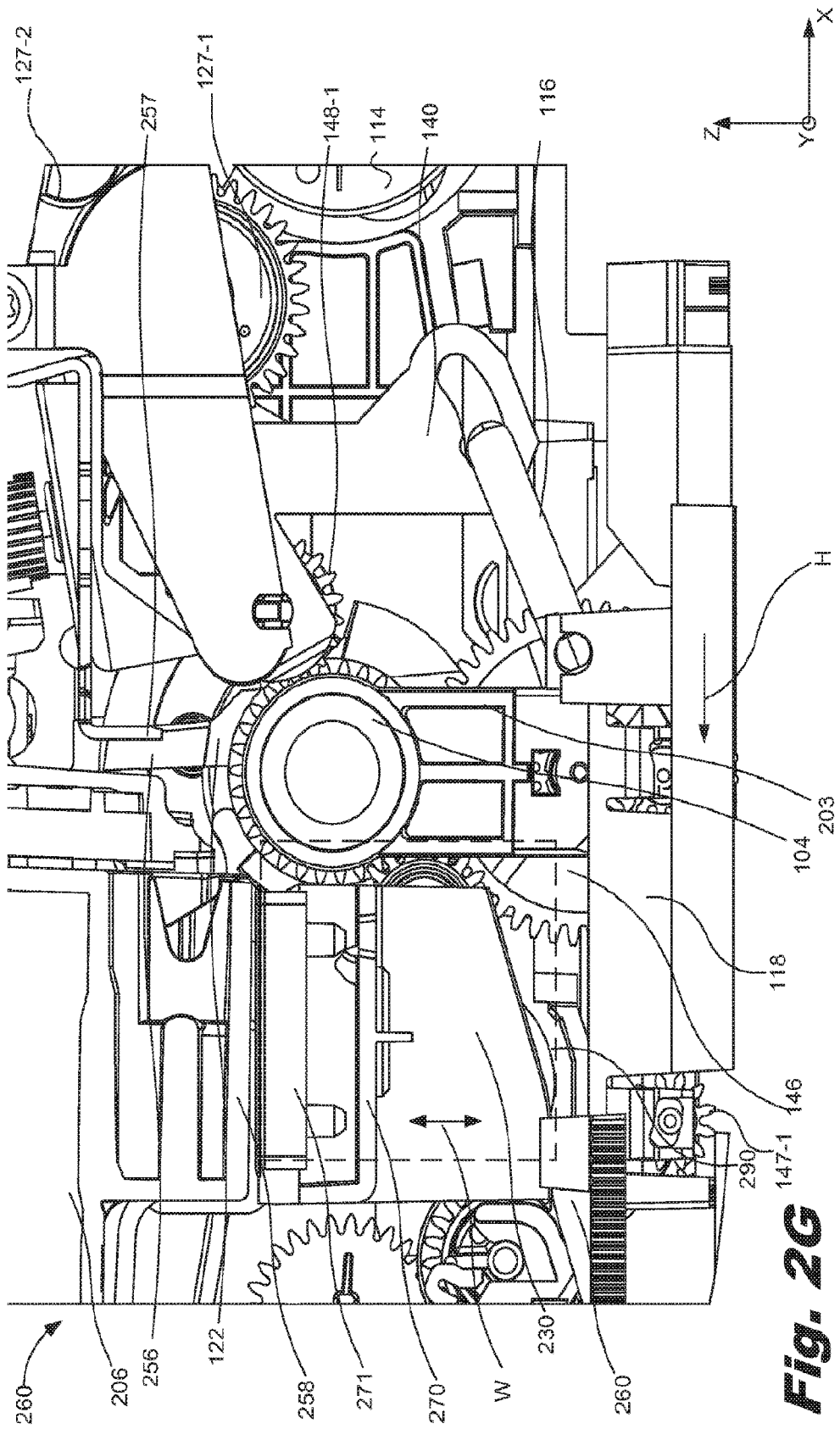
FIG. 2G is a cutaway side view of the selectable drive system that is capped, according to one example of principles described herein.

With reference to FIGS. 1A and 2G, and other figures, the selectable drive system (100) includes a capping system (170). The capping system (170) is used to cap and humidically seal a number of pens (258) coupled to a carriage (206). The capping system (170) includes a rack (118). The rack (118) includes a ramp (260) formed therein that interfaces with an elevator (230) formed in the capping body (270). The capping system (170) further includes a number of caps (271) assembled to the capping body (270). In one example, the number of caps (271) is equal to the number of pens (258) that may be coupled to the carriage (206). The ramp (260) formed on the rack (118) of the capping system (170) moves the elevator (230). For example, the elevator (230) moves in a vertical direction as indicated by arrow W in FIG. 2G as the rack (118) and its ramp (260) move in a horizontal direction as indicated by arrow H in FIG. 2F.

The movement of components within the selectable drive system (100) is at least partially based on the state and positioning of the shifter (122). As depicted in FIG. 2A, the shifter is coupled to the feedshaft (104) such that the shifter (122) is free to rotate about the feedshaft (104). The shifter (122) includes a friction device (250) formed therein as depicted in FIG. 2D. The friction device (250) creates an amount of drag on the feedshaft (104). This drag produced by the friction device (250) ensures that the shifter (122) always biases itself in the direction of rotation of the feedshaft (104). In this manner, the shifter (122) is able to be repositioned and selectively engage and disengage with the drive swing arm (108) based on a direction of rotation of the feedshaft (104). It is noted that the direction of rotation of the feedshaft (104) is based on the direction of rotation of the motor (114), and that the direction of rotation of the motor (114) is based on the signals received from the controller (101).

The shifter (122) either places the printing device (105) in a printing and uncapped state or in a scanning and capped state based in the direction of rotation of the feedshaft (104). Here, "capped state" refers to the capping system (170) capping the pens (FIG. 2G, 258), and "uncapped state" refers to the capping system (170) disengaging the caps (271) from the pens (258). Thus, the shifter (122) is the device within the selectable drive system (100) that determines, at least partially, which state the printing device (105) is in. In one example, the capping assembly (290) caps the pens (258) of the printing device (105) when the shifter (122) is in a drive position and uncaps the pens (258) of the printing device (105) when the shifter (122) is in a clear position.

Further, the shifter (122) is influenced by the positioning of other components within the selectable drive system (100). For example, the carriage (206) prevents the shifter (122) from over rotating about the feedshaft (104) when the shifter (122) is in a scanning system drive position. In this state, the rack (118) is in a scan position as well, and the pens (258) are capped. Conversely, when the rack (118) is in an uncapped position, the pens (258) are uncapped, and the shifter (122) is oriented in a printing system drive position. More information regarding the interaction between the function of the shifter (122) and the rack about the capping system (170) is described below.

The selectable drive system (100) further includes a scan drive system (160) as depicted in, for example, FIGS. 1A, 1B, 6A, 6B, and other figures. The scan drive system (160) is used to drive components of a scanning device (107) associated with the printing device (105), and includes a set of bevel gears (128), a PTO shaft (112), and a set of worm gears called a worm drive (110). Thus, in one example, the printing device (105) is an all-in-one (AIO) printer/scanner. In one example, the PTO shaft (112) is used to connect the set of bevel gears (128) and the worm drive (110) to each other. Further, the worm drive (110) is connected to components of a scanning device (107) associated with a printing device (105) and is used to feed documents to be scanned by the scanning device (107) past, for example, an optical scanning device.

As mentioned above, the scan drive system (160) includes the set of bevel gears (128). For example, as depicted in FIG. 1C for example, the scan drive system (160) includes the first intermediate gear (127-1) that meshes with a second intermediate gear (127-2) formed on the first bevel gear (128-1). The first bevel gear (128-1) and the second bevel gear (128-2) are set perpendicular to each other. As a result, the teeth on the first bevel gear (128-1) and the teeth on the second bevel gear (128-2) are designed to engage with each other at a 90-degree angle. The second bevel gear (128-2) is coupled to or formed with a first end of the PTO shaft (112).

The PTO shaft (112) drives the worm drive (110) depicted in, for example, FIGS. 1, 2, 6A, and 6B. In more detail, the PTO shaft (112) is coupled to or formed with a worm (126-1). The worm (126-1) and a meshing worm gear (126-2) are set perpendicular to each other. As a result, the teeth on the worm (126-1) and the teeth on the worm gear (126-2) are designed to engage with each other at a 90-degree angle. This allows the worm gear (126-2) to rotate as the worm (126-1) rotates. The worm gear (126-2) is axially connected to or formed with a third intermediate gear (126-3). As a result, as the worm gear (126-2) rotates, the third intermediate gear (126-3) rotates in the same rotational direction. The third intermediate gear (126-3) meshes with a fourth intermediate gear (126-4), and the further intermediate gear (126-4) is used to drive a number of components of the scanning device (107) including, for example, a number of rollers used to feed media through the scanning device (107) of scanning of the media.

The bevel gears (128) of the scan drive system (160) engage with a feedshaft drive gear (120) of the feedshaft (104) when the rack (118) of the drive selector assembly (180) is in a scan position that is designed by arrow H of FIG. 2F, for example. A second selector gear (148-2) rotatably coupled to the selector swing arm (140) is meshed with the first intermediate gear (127-1) when the drive selector assembly (180) is positioned in the scan position. A first selector gear (148-1) is remains meshed with the feedshaft drive gear (120) when the selector swing arm (140) is in any position including the capped and scan position and the uncapped and printing position. The teeth of the intermediate gears (127) engage with teeth of selector gears (148-1, 148-2) of a selector swing arm (140) when the rack (118) of the drive selector assembly (180) is in the scan position. As depicted in FIG. 6A for example, with the rack (118) in the scan position, the selector swing arm (140) is in a scanning drive position. Further, the teeth of the first selector gear (148-1) engage with the teeth of the feedshaft drive gear (120) as well as the first intermediate gear (127-1). The first intermediate gear (127-1) meshes with a second intermediate gear (127-2) formed on the first bevel gear (128-1). In this manner, the second intermediate gear (127-2) and the first bevel gear (128-1) form a gear cluster. A gear cluster is any assembly of gears permanently attached to a shaft or formed from as a monolithic set with a common axis.

The second intermediate gear (127-2) formed on the first bevel gear (128-1) being meshed with the first intermediate gear (127-1) is caused to rotate. This actuates the first bevel gear (128-1) portion of the combination of the second intermediate gear (127-2) and first bevel gear (128-2). The first bevel gear (128-1) meshes with the second bevel gear (128-2). Again, the movement of the intermediate gears (127-1, 127-2) and the bevel gears (128) is caused by the rotation of the feedshaft (104) when the rack (118) of the drive selector assembly (180) is in the scan position. As a result, the motor (114) is able to drive the components of the scanning device (107) via the scan drive system (160). In contrast, the intermediate gears (127-1, 127-2) and the bevel gears (128) of the scan drive system (160) disengage from the feedshaft drive gear (120) of the feedshaft (104) when the rack (118) of the drive selector assembly (180) is in an uncapped position and the second selector gear (148-2) of the selector swing arm (140) is disengaged from the first intermediate gear (127-1). For example, the teeth of the first intermediate gears (127-1) disengage from the teeth of the second selector gear (148-2) when the rack (118) of the drive selector assembly (180) is in uncapped position. As described in FIG. 6B, with the rack (118) in the uncapped position, the selector swing arm (140) is in a printing system drive position. As a result, the motor (114) is not able to drive the scan drive system (160) and, in turn, the components of the scanning device (107).

As depicted, the selectable drive system (100) includes the drive selector assembly (180). The drive selector assembly (180) selects between driving the capping system (170) to uncap the pens (258) to allow for the printing device (105) to drive the printing drive system or driving the scan drive system (160) based at least partially on a position of the selector swing arm (140) of the drive selector assembly (180) and the resulting position of the rack (118). For example, when the rack (118) is in the scan position and the selector swing arm (140) is in the scanning system drive position, the motor (114) drives components of the scan drive system (160). When the rack (118) is in an uncapped position and the selector swing arm (140) is in a printing system drive position, the motor (114) drives components of the capping system (170) to uncap the pens (258). In this manner, the single motor (114) is used to drive both the printing system and the scanning system. This reduces the amount of resources used in manufacturing the printing device (105), and creates a more lightweight printing device (105) with a relatively smaller footprint among many other benefits.

Figure 3:
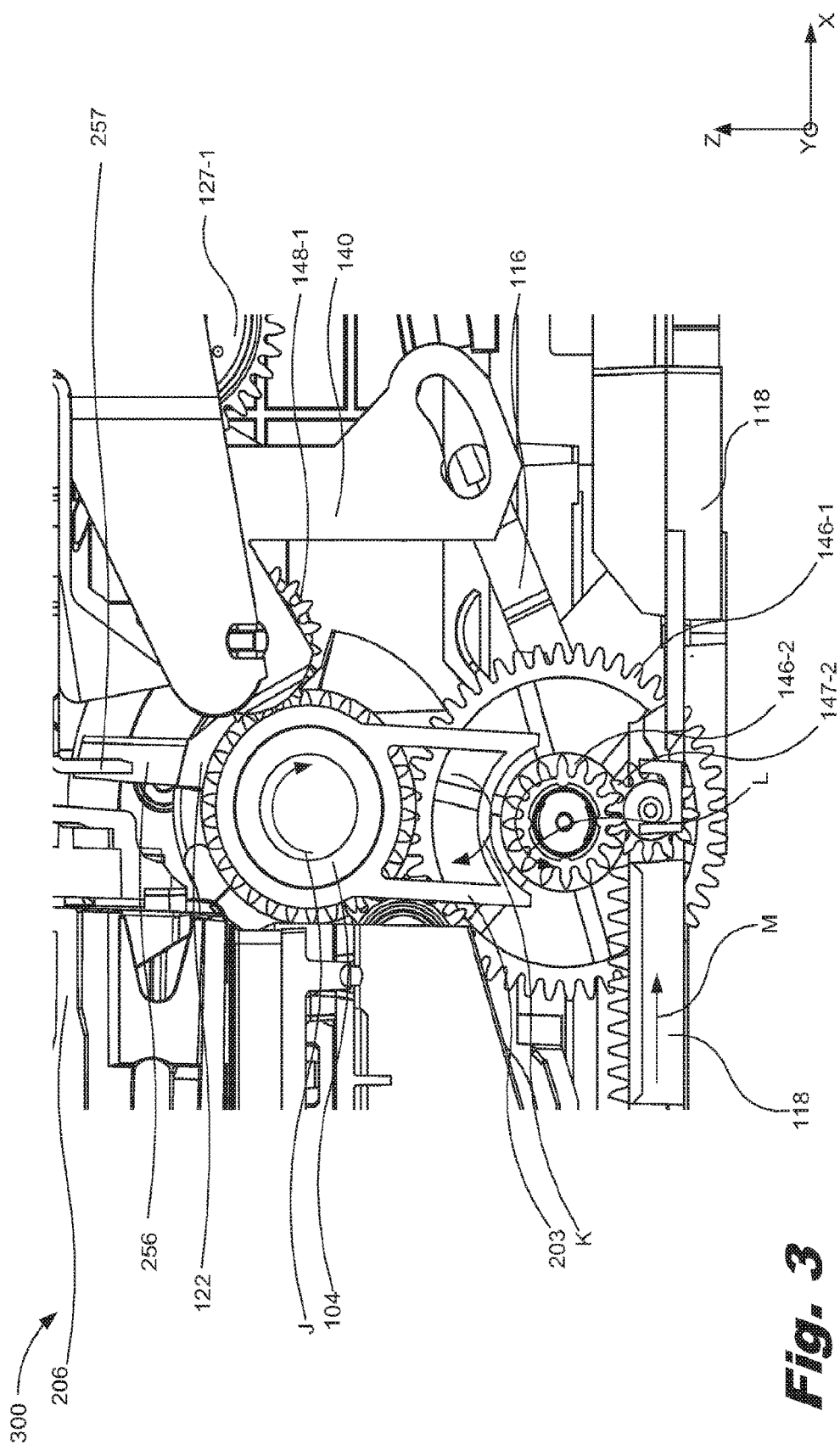
FIG. 3 is a cutaway side view of the selectable drive system preparing to uncap, according to one example of principles described herein.

In one example, the drive selector assembly (180) includes the rack (118). The rack (118) transitions between the scan position, and the uncapped and print position. With reference to FIGS. 1A, 1B, 2C, 2E-2G, 3, 6A, and 6B, the rack (118) is slidably connected to the selector swing arm (140) via a connector arm (116). As the rack (118) transitions from the scan position to the uncapped position as depicted in FIGS. 3, 6B by arrows M and T, the selector swing arm (140) transitions from the scanning system drive position to the printing system drive position. Similarly, as the rack (118) transitions from the uncapped position to the scan position as depicted in FIGS. 2F and 6A by arrows H and S, the selector swing arm (140) transitions from the printing system drive position to the scanning system drive position.

The rack (118) is connected to a cluster gear set (146). As described below, the cluster gear set (146) includes a first cluster gear (146-1) and a second cluster gear (146-2) as depicted in FIGS. 2C, 2E, 3, and 6B for example. The first cluster gear (146-1) is larger than the second cluster gear (146-2). Further, the first cluster gear (146-1) is connected to the second cluster gear (146-2) on either a common shaft, or as a monolithic set. The teeth of the first cluster gear (146-1) engage with teeth of the feedshaft drive gear (120). As a result, as the feedshaft drive gear (120) rotates, the rotational motion is transferred to the first cluster gear (146-1). The second cluster gear (146-2) engages or disengages with teeth of the rack (118) depending on the position of the drive swing arm (108). When the second cluster gear (146-2) engages with the rack (118), the rotational motion of the second cluster gear (146-2) is transferred to a linear motion of the rack (118). As a result, the rack (118) moves laterally between the scan position and the uncapped position based on a movement of the cluster gears (146). More information about the rack (118) and the cluster gears (146) is described below.

The drive selector assembly (180) includes a connector arm (116). The connector arm (116) is pivotally connected to the rack (118) and to the selector swing arm (140). As the position of the rack (118) changes, the position of the connector arm (116) changes. For example, when the rack (118) is in the scan position as depicted in, for example, FIGS. 2G, 3, and 6A, the connector arm (116) is in a relatively horizontal position. This pulls the selector swing arm (140) to the scanning system drive position. When the rack (118) is in the uncapped position, the connector arm (116) is in a relatively vertical position. This pushes the selector swing arm (140) to the printing system drive position as depicted in, for example, FIGS. 1B, 2C, 2E, 2F, and 6B. Thus, as the position of the connector arm (116) changes, the selector gears (148) of the selector swing arm (140) engage or disengage with the bevel gears (128).

The selectable drive system (100) described thus far is a compact design that uses a single motor to drive components of a scanning device (107), components to cap and uncap pens of a printing device (105), and a printing device (105). As a result, by eliminating a motor to drive components of a scanning device (107) and another motor to drive components of a capping system, and instead using a single motor for the scanning device (107), the capping device, and the printing device (105), the overall size of the printing device (105) is significantly reduced. In one example, the overall length of the printing device (105) is reduced by 35 millimeters (mm).

FIG. 1C is an isometric view of a selectable drive system, according to one example of principles described herein. As mentioned above, the motor (114) is connected to the feedshaft (104) via a pulley (132) and a belt (134) coupling the pulley (132) to a drive shaft of the motor (114). The motor (114) is instructed to operate based on instructions received from the controller (101). The controller (101) sends instructions to the motor (114) regarding the direction of rotation, the duration of rotation, and the speed of rotation, among other operational states.

As the motor (114) rotates, the rotation of the motor (114) drives the belt (134). The belt (134) in turn drives the pulley (132). Since the pulley (132) is connected to the feedshaft (104), the rotation of the pulley (132) is transferred to the feedshaft (104). In one example, if the motor (114) rotates clockwise the feedshaft (104) rotates clockwise. If the motor (114) rotates counter clockwise, the feedshaft (104) rotates counter clockwise. In one example, the motor (114) provides sufficient torque to drive the components of the selectable drive system (100) and components connected to the selectable drive system (100).

As depicted, the selectable drive system (100) includes a feedshaft drive gear (120). The feedshaft drive gear (120) is pressed on to the feedshaft (104), and is used to transfer torque placed on the feedshaft (104) by the motor (114) to the scan drive system (160), the capping system (170), and the drive selector assembly (180). For example, since the teeth of the feedshaft drive gear (120) are always engaged with the teeth of the first cluster gear (146-1), the feedshaft drive gear (120) provides torque to the first cluster gear (146-1) as the feedshaft rotates (104). Depending on if the teeth of the second cluster gear (146-1) are engaged with the teeth of the rack (118), torque may be selectably applied to rack (118).

In another example, since the teeth of the feedshaft drive gear (120) are always engaged with the teeth of the first selector gear (148-1), the feedshaft drive gear (120) provides torque to the selector gears (148) as the feedshaft rotates (104). Depending on if the selector gears (148), including the second selector gear (148-2) are meshed with the intermediate gear (127-1), torque may be applied to the scan drive system (180).

As mentioned above, the shifter (122) is connected to the feedshaft (104). The shifter (122) selectively shifts the drive selector assembly (180) between two positions including the scanning system drive position and the capping and printing system drive position. The shifter (122) interfaces with the carriage (FIGS. 4A-4C, 206), a swing arm interface (FIG. 2A, 212) of the drive swing arm (108), and the feedshaft (104) via a friction device (FIG. 2B, 230) as depicted in, for example, FIGS. 1 through 2B, 3, and 4A through 4C. This allows the cluster gears (146) to engage and disengaged from the rack (118). As a result, if the cluster gears (146) are engage with the rack (118), the capping system (170) caps or uncaps the pens of the printing device (105) based on the position of the rack (118).

As mentioned above, the output shaft (102) is connected to the feedshaft (104) via a one-way clutch (124). The one-way clutch (124) engages the output shaft (102) when the feedshaft (104) rotates in one direction. However, the one-way clutch (124) does not engage the output shaft (102) when the feedshaft rotates in an opposite direction. For example, if the feedshaft (104) rotates clockwise, the output shaft (102) rotates counter clockwise. If the feedshaft (104) rotates counter clockwise, the output shaft (102) does not rotate. As a result, the print media moves away from the printing device (105) such that print media are ejected from the printing device (105) during a printing operation, and not back into the printing device (105).

FIG. 2A is an isometric view of a selectable drive system, according to one example of principles described herein. The printing device (105) is in a printing mode as depicted in FIG. 2A. Further, the shifter (122) is in a clear position. In the clear position, the arm (256) of the shifter (122) rotates from a drive position to the clear position when the feedshaft (104) rotates forward as indicated by arrow C. In the clear position, the arm (256) of the shifter (122) does not interface with a carriage (206). As a result, the carriage (206) is free to move along the carriage rail (215). More information about the clear position will be described in FIG. 2B.

As depicted, the shifter (122) includes a shifter interface (214). The shifter interface (214) interfaces with a swing arm interface (212) of the drive swing arm (108). The shifter interface (214) selectively interfaces with the swing arm interface (212) as the feedshaft (104) rotates as depicted via the difference in position of the shifter (122) in FIGS. 2A and 2D. These interfaces (212, 214) prevent the drive swing arm (108) from over rotating past a certain position. The drive swing arm is rotatably coupled to the bearing (203) via, for example a swing arm rod (103). This, in turn, allows the drive swing arm (108) to swing between two positions such that the cluster gears (146) can engage or disengaged from the rack (118). This allows the scan drive system (160) to drive the components of the scanning device (107). In one example, the scan drive system (160) drives components of the scanning device (107) without capping or uncapping the pens (258) of the printing device (105) at the same time.

The drive swing arm (108) and the bearing (203) move together since they are coupled together via the swing arm rod (103). In one example, if the drive swing arm (108) rotates counter clockwise as a result of the interfaces (214 and 212) making contact, the bearing (203) rotates counter clockwise with the drive swing arm (108). If the drive swing arm (108) rotates clockwise as a result of the interfaces (214 and 212) making contact, the bearing (203) rotates clockwise.

FIG. 2B is an isometric view of the selectable drive system (100) illustrating a clearance between the shifter (122) and pens (258), according to one example of principles described herein. As described below, when the shifter (122) is in the clear position as depicted in FIG. 2B, the shifter (122) does not interface with the carriage (206). As a result, the carriage (206) is free to move along the carriage rail (215) to which the carriage (206) is slidably coupled. Thus, as depicted in FIG. 2B as well as 1B, 2A, 4C, and 6B, for example, the shifter (122) is in a clear position. In the clear position, the arm (256) of the shifter (122) makes contact with the capping body (270) of the capping system (170). However, in another example, the arm (256) of the shifter (122) may make contact with any another portion of the printing device (105) such as a housing or a pillar formed into the printing device (105) for the purpose of stopping the rotation of the shifter (122). As a result, the capping body (270) or another component of the printing device (105) prevents the shifter (122) from rotating past a certain point.

As depicted in FIG. 2B, the carriage (206) is at full left position, or, in other words, in the Y-direction as indicated by the Cartesian coordinate indicator of FIGS. 2A and 2B. In the full left position, the carriage (206) makes contact with a left wall (410) of the printing device (105) as depicted in 2A and 4 for example. With the shifter (122) in the clear position, the arm (256) of the shifter (122) does not interface with the carriage (206) as indicated by the clearance (208). In some examples, the clearance (208) between the shifter (122) and the carriage (206) is between 2 and 3 millimeters (mm). As a result, the carriage (206) is free to move along a carriage rail (215) in the positive and negative Y-directions via a carriage motor to eject the printing fluid via the pens (258) onto the print medium to form the image.

FIG. 2C is an isometric view of a selectable drive system (100) preparing to cap, according to one example of principles described herein. Once the printing device (105) has finished a print job, the pens (258) of the printing device (105) are capped in order to humidically seal the nozzles of the pens (258) from contaminants and drying when the printing device (105) is not being used to print images on print media. In one example, the feedshaft (104) rotates clockwise as indicated by arrow D. This moves the shifter (122) to a drive position. In the drive position, the drive arm interface (212) interfaces with the shifter interface (214). This causes the drive swing arm (108) and the bearing (203) to swing clockwise as indicated by arrow E. The cluster gears (146) rotatably coupled to the drive swing arm (108) to engage with the rack (118) when the rack (118) is in the uncapped position as depicted in FIG. 2C. The second cluster gear (146-2) as depicted in FIG. 2C is depicted as being meshed with a first idler gear (147-1) that is rotatably coupled to a portion of the rack (118) on the left or in the negative X-direction. An idler gear is any gear that does not drive a shaft to perform any work. In the case of the first idler gear (147-1), its function is to allow the second cluster gear (146-2) to idle after a transition of the rack 118) from the left to the right as depicted in FIG. 2C. In one example, the cluster gear (146) will stop spinning due to friction in between different positions of the rack (118).

FIG. 2D is an isometric view of a selectable drive system preparing to cap, according to one example of principles described herein. In preparing to cap the pens (258) of the carriage (206), a friction device (250) biases the shifter (122) to rotate in the same direction as the feedshaft (104). As depicted in FIG. 2D, the shifter (122) includes a friction device (250). The friction device (250) biases the shifter (122) to rotate in the same direction as the feedshaft (104). The shifter (122) includes a friction device (250) formed therein as depicted in FIG. 2D. The friction device (250) creates an amount of drag on the feedshaft (104). This drag produced by the friction device (250) ensures that the shifter (122) always biases itself in the direction of rotation of the feedshaft (104). In this manner, the shifter (122) is able to be repositioned and selectively engage and disengage with the drive swing arm (108) based on a direction of rotation of the feedshaft (104). It is noted that the direction of rotation of the feedshaft (104) is based on the direction of rotation of the motor (114), and that the direction of rotation of the motor (114) is based on the signals received from the controller (101). The shifter (122) rotates with the feedshaft (104) until it interfaces with the carriage (206) or the capping body (270). Once the shifter (122) interfaces with the carriage (206) or the capping body (270), the rotation of the feedshaft (104) is such that the drag created by the friction device (250) is overcome. As a result, the feedshaft (104) can still rotate while the shifter (122) is restricted from over-rotating, or rotating past a desired or defined point.

In this example, as the feedshaft (104) rotates clockwise as depicted in FIG. 2C, the friction device (250) creates the drag. As a result, the shifter (122) rotates clockwise due to the drag until the arm (256) of the shifter (122) is in an upright position as indicated by the upwards Z-direction. In one example, the arm (256) of the shifter (122) interfaces with a first portion (257) of the framework of the selectable drive system (100). Once the shifter (122) is in the upright position, the shifter (122) is in the drive position as depicted in FIG. 2D. In another example, as the feedshaft (104) rotates counter clockwise, the friction device (250) again creates drag against the feedshaft (104). As a result, the shifter (122) rotates counter clockwise due to the drag until the arm (256) of the shifter (122) interfaces with the capping body (270). Once the shifter (122) interfaces with the capping body (270) as depicted in, for example, FIGS. 1 through 2B, 3, and 4A through 4C, the shifter (122) is in the clear position.

FIG. 2E is a cutaway side view of a selectable drive system (100) preparing to cap, according to one example of principles described herein. The friction device (250) biases the shifter (122) to rotate in the same direction as the feedshaft (104). As depicted in FIG. 2E, the carriage (206) is moved to the left wall (410) of the printing device (105). Since the carriage (206) is moved to the left wall (FIGS. 2A and 4A, 410) of the printing device (105), the carriage (206) interfaces with the arm (256) of the shifter (122). This prevents the shifter (122) from rotating past the drive position as depicted in FIG. 2E, and allows the selectable drive system (100) to prepare to cap the pens (258) of the printing device (105).

FIG. 2F is a cutaway side view of a selectable drive system preparing to cap, according to one example of principles described herein. The cluster gears (146-1, 146-2) drive the rack (118) from the uncapped position to the capped and scan position. Now that the shifter (122) is blocked by the carriage (206), the swing arm interface (212) and the shifter interface (214) interface with each other. Further, the shifter (122) remains in the upright position. This causes the drive swing arm (108) to lock in place as depicted in FIG. 2F. As a result, the feedshaft (104) can rotate without the drive swing arm (108) rotating. To cap the pens (258), the feedshaft (104) rotates counter clockwise as indicated by arrow F. As mentioned above, the feedshaft drive gear (120) engages with the cluster gears (146). Since the feedshaft is rotating counter clockwise, the cluster gears (146) rotate clockwise as indicated by arrow G. The teeth of the cluster gears (146) engage with the teeth of the rack (118). As the cluster gear (146) engages with the rack (118), the rack (118) moves, as indicated by arrow H, from the uncapped position of FIG. 2F to the capped and scan position of FIG. 2G.

FIG. 2G is a cutaway side view of a selectable drive system (100) that is capped, according to one example of principles described herein. The cluster gears (146-1, 146-2) drive the rack (118) from the uncapped position to the capped and scan position. The rack (118) is connected to a ramp (260). The ramp (260) may be coupled to the rack (118) or formed therein. As a result, if the rack (118) moves in either direction, the ramp (260) moves (260) in the same direction. The ramp (260) is used to move the elevator (230) up and down as indicated by arrow W. For example, as the rack (118) transitions from the uncapped position to the capped and scan position, the ramp (260) is pushed underneath the elevator (230). This results in the elevator (230) moving upwards in the positive Z-direction. When the elevator (230) is moved upwards, the elevator (230) presses a number of caps (271) against the pens (258). The caps (271), being made of an elastomeric material, are compressed against the pens (258) to provide a seal. As a result, the caps (271) protect the pens (258) from drying out, from contamination, or combinations thereof.

Conversely, as the rack (118) transitions from the capped and scan position to the uncapped position and printing position, the ramp (260) is removed from underneath the elevator (230). This results in the elevator (230) causing the capping body (270) to move downwards. When the capping body (270) is moved down, the caps (271) of the capping body (270) do not press against the pens (258). Since the caps (271) do not push against the pens (258), the pens (258) are uncapped. As a result, the pen (258) may be used for a print job. In one example, the capping body (270) moves downward at least a distance to allow for the carriage (206) and its pens (258) to clear the capping body (270) during a printing process.

FIG. 3 is a cutaway side view of a selectable drive system (100) preparing to uncap, according to one example of principles described herein. The cluster gears (146-1, 146-2) drive the rack (118) from the capped and scan position to the uncapped and printing position. As the feedshaft (104) rotates clockwise as indicated by arrow J, the swing arm interface (212) and the shifter interface (214) separate from one another. This causes the drive swing arm (FIG. 2A, 108) to rotate clock wise as indicated by arrow K as depicted in FIGS. 2F and 3.

As mentioned above, the feedshaft drive gear (120) engages with the cluster gears (146). In FIG. 3, the second cluster gear (146-2) is meshed with a second idler gear (147-2) after the rack (118) moved to the left as indicated in FIGS. 2F and 2G. Since the feedshaft (104) is rotating clockwise, the cluster gear (146) is caused rotate counter-clockwise as indicated by arrow L. The teeth of the cluster gears (146) engage with the teeth of the rack (118). As the cluster gear (146) engages with the rack (118), the rack (118) moves, as indicated by arrow M, from the capped and scan position of FIG. 2G to the uncapped and printing position of FIG. 2E.

Figure 4A:
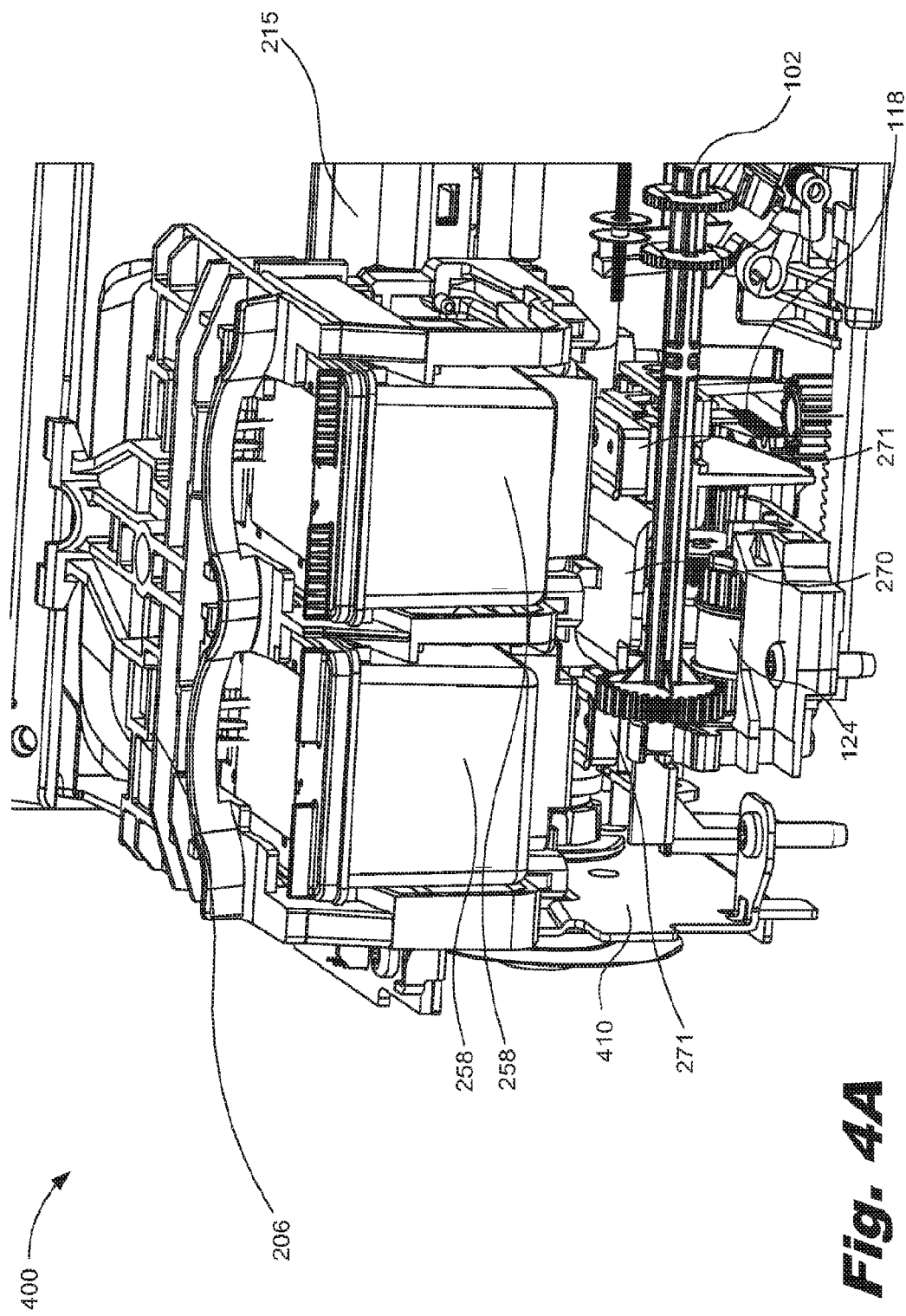
FIG. 4A is an isometric view of the selectable drive system preparing to print, according to one example of principles described herein.

FIG. 4A is an isometric view of a selectable drive system (100) preparing to print, according to one example of principles described herein. As depicted in FIG. 4A the carriage (206) is located at the left wall (410) of the printing device (105) at the end of the process of uncapping the pens (258). However, the shifter (122) is still interfacing with the carriage (206) as depicted in FIG. 2F. Thus, in order to cause the shifter (122) to rotate and move down to a clear position, the carriage (206) is caused to move. The carriage (206) is instructed to move by the controller (101) that sends instructions to a carriage motor.

Figure 4B:
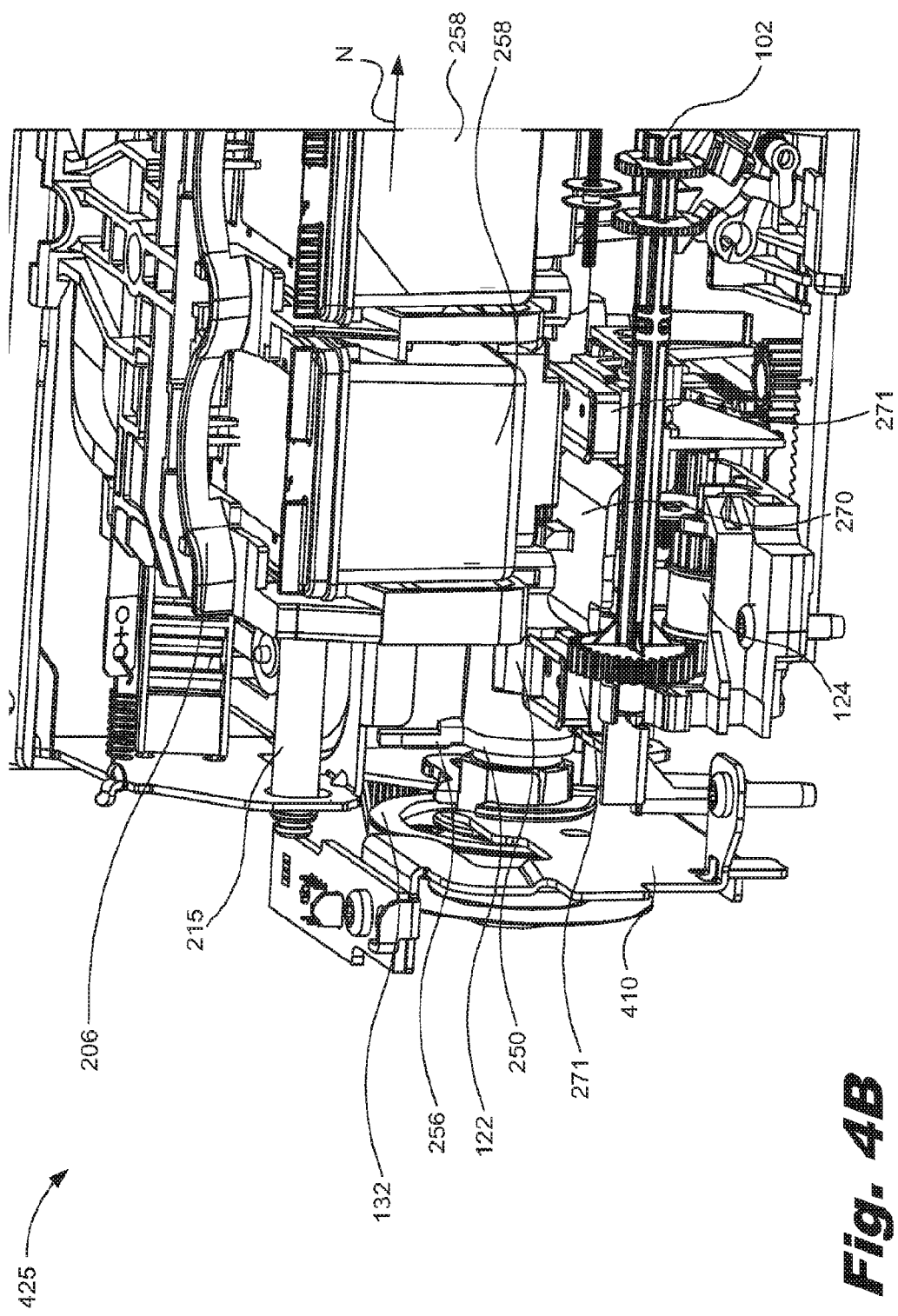
FIG. 4B is an isometric view of the selectable drive system preparing to print, according to one example of principles described herein.
Figure 4C:
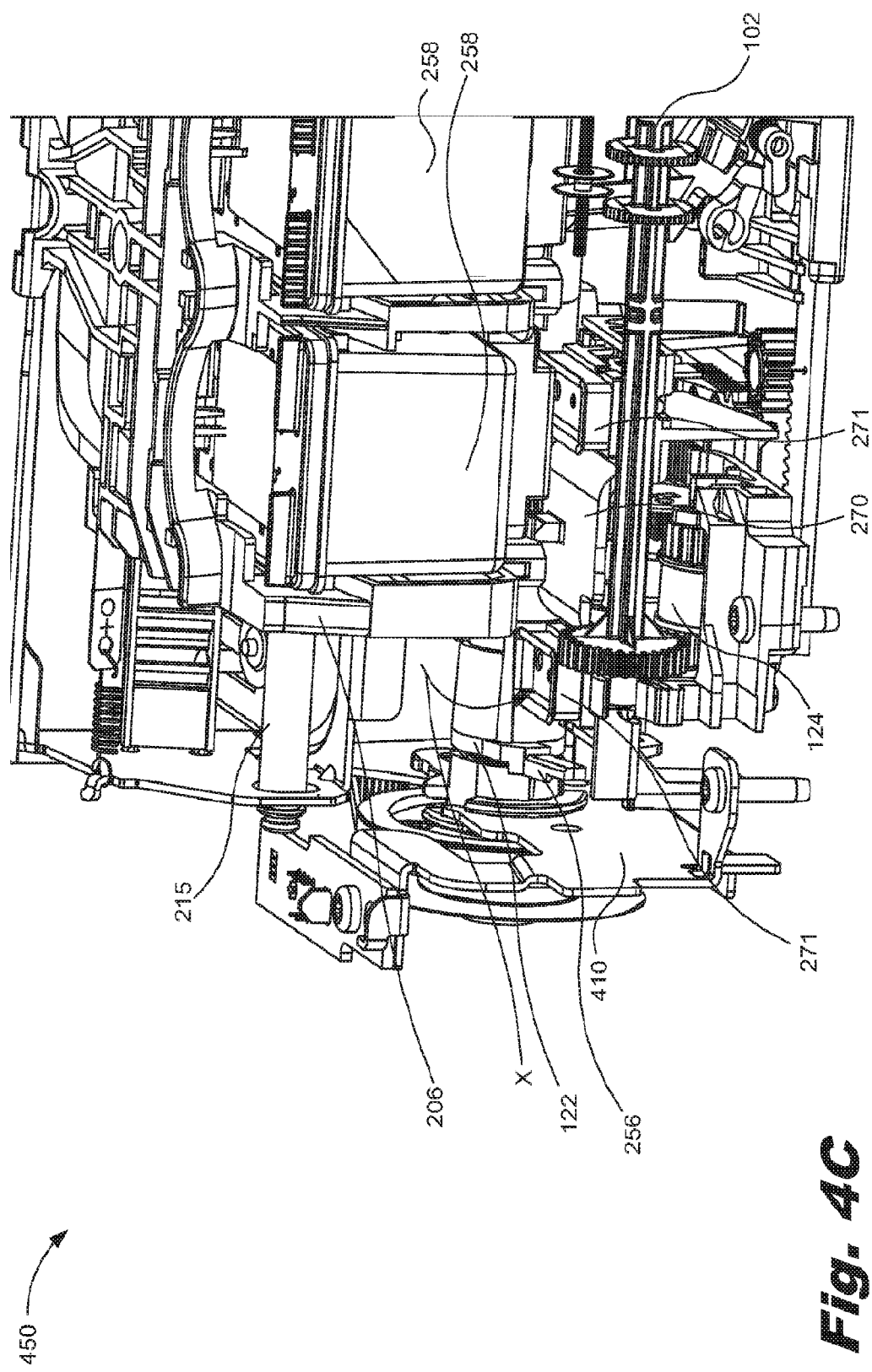
FIG. 4C is an isometric view of the selectable drive system preparing to print, according to one example of principles described herein.

FIG. 4B is an isometric view of the selectable drive system (100) preparing to print, according to one example of principles described herein. As described below, the carriage (206) is moved to away from the left wall (410) of the printing device (105). As mentioned above, the carriage (206) is located at the left wall (410) of the printing device (105) at the end of the uncapped routine as depicted in FIG. 4A. As depicted in FIG. 4B, however, the carriage (206) moves away from the left wall (410) such that the shifter (122) does not interface with the carriage (206). When the feedshaft (104) rotates the shifter (122) rotates as well to bring the arm (256) of the shifter (122) into a clear position where the arm (256) of the shifter (122) is in the downward position and not held by the carriage (206) to allow the uncapped pens (258) to begin printing on a print media. As a result, the shifter (122) can rotate from a drive position depicted in FIG. 4B to a clear position as depicted in FIG. 4C. In some examples, a carriage motor moves the carriage (206) along the carriage rail (215) away from the left wall (410).

FIG. 4C is an isometric view of a selectable drive system (100) preparing to print, according to one example of principles described herein. As described below, with the carriage (206) moved away from the left wall (410) of the printing device (105), the shifter (122) can rotate from a drive position to a clear position. To rotate the shifter (122) from the drive position to the clear position, the feedshaft (104) rotates counter-clock wise as indicated by arrow X. Since the carriage (206) no longer interfaces with the shifter (122), the shifter (122) rotates until the shifter (122) contacts the capping body (270) as described above. Now the shifter (122) is in the clear position. In the clear position, the printing device (105) is ready to begin printing since the shifter (122) will not interfere with the movement of the carriage (206) during a print job and because the shifter (122) has caused the drive swing arm (108) to move to a printing position as depicted in, for example, FIGS. 2C through 2F and 6B.

FIG. 5A is an isometric view of components of a selectable drive system (100), according to one example of principles described herein. FIG. 5A describes components of the selectable drive system that do not interfere with other components of a printing device (105). In some examples, printing devices (105) have an output drive system, such as the output shaft (102) and the one way clutch (124), located in relatively different locations in the printing device (105) than other components of the printing device (105). However, the components of the selectable drive system (100), specifically the capping system (170), are located in relatively the same location as the output drive system. In other printing devices (105), since space is limited, a capping system (170) that can move up and down, side to side, and back and forth, cannot be used with the selectable drive system (100) in proximity to the output drive system. However, examples described herein provide the capping system (170) that moves up and down as described above. This allows the capping system (170) and the output system to be located in relatively the same location within the printing device (105) or juxtaposition one another as described herein.

In one example, the printing device (105) includes a transmission housing (504). The transmission housing (504) is used to house the gears of the selectable drive system (100) and/or allow the gears to be mounted on the transmission housing (504). For example, the one-way clutch (124) is housed in the transmission housing (504). The output shaft is rotatably coupled to the transmission housing (504). Further, the components of the selectable drive system (100) do not interfere with other components of the printing device (105). For example, the capping system (170) does not interfere with the transmission housing (504).

FIG. 5B is a top view of components of the selectable drive system (100), according to one example of principles described herein. As similarly presented in connection with FIG. 5A, the components of the selectable drive system (100) do not interfere with other components of a printing device (105). In the view of FIG. 5B, the capping system (170) is located underneath other components of the selectable drive system (100) of the printing device (105). For example, the capping system (170) is located underneath the feedshaft (104) and the output shaft (102). Due to the design of the capping system (170) and its proximity to the other components. The capping system (170) is able to travel up and down as described above without interfering with the operation of other components.

FIG. 6A is a cutaway side view of the scan drive system (160) of the selectable drive system (100) in a scanning system drive position, according to one example of principles described herein. Here, when the rack (118) is in the scan position, the selector swing arm (108) is in a scanning system drive position. As described above, the feedshaft drive gear (120) engages with the cluster gears (146). Since the feedshaft (104) is rotating counter-clockwise as indicated by arrow P, the cluster gears (146) rotate clockwise. The teeth of the cluster gears (146) engage with the teeth of the rack (118). As the cluster gears (146) engage with the rack (118), the rack (118) moves, as indicated by arrow S, from the uncapped position to the scan position.

As the rack (118) moves from the uncapped position to the scan position, the connector arm (116) forces the selector swing arm (140) to rotate about a pivot (610) as indicated by arrow Q to a scanning system drive position as described above in connection with FIGS. 2G, 3, and 6A. When the selector swing arm (140) is in the scanning system drive position, teeth of the first intermediate gear (127-1) engage with teeth of selector gears (148), and, more specifically, the second selector gear (148-2). Further, the teeth of the first selector gear (148-1) engage with the teeth of the feedshaft drive gear (120) and rotate the first intermediate gear (127-1) as indicated by arrow R. In other words, the teeth of the intermediate gear (127-1) engage with the teeth of the feedshaft drive gear (120) via the teeth of the selector gears (148) when the selector swing arm (140) of the drive selector assembly (180) is in the scanning system drive position. As a result, the motor (114) is able to drive the components of the scanning device (107) via the scan drive system (160).

FIG. 6B is a cutaway side view of a scan drive system (100) in a capped position, according to one example of principles described herein. As will be described below, when the selector swing arm (140) is in the printing system drive position, the motor (114) does not drive the scan drive system. In this state, the feedshaft drive gear (120) engages with the cluster gears (146). Since the feedshaft is rotating clockwise, as indicated by arrow V, the cluster gears (146) rotate counter-clockwise. The teeth of the cluster gears (146) engage with the teeth of the rack (118), and the rack (118) moves, as indicated by arrow T, from the scan position to the uncapped position.

As the rack (118) moves from the scan position to the uncapped position, the connector arm (116) forces the selector swing arm (140) to rotate about the pivot (610) as indicated by arrow U to the printing system drive position as described above in connection with, for example, FIGS. 1A, 1B, 2C, 2E, 2F, and 6B. When the selector swing arm (140) is in the printing system drive position, teeth of the first intermediate gear (127-1) disengage with teeth of second selector gear (148-2). As a result, the motor (114) is not able to drive the components of the scanning device (107) via the scan drive system (160).

Figure 7:
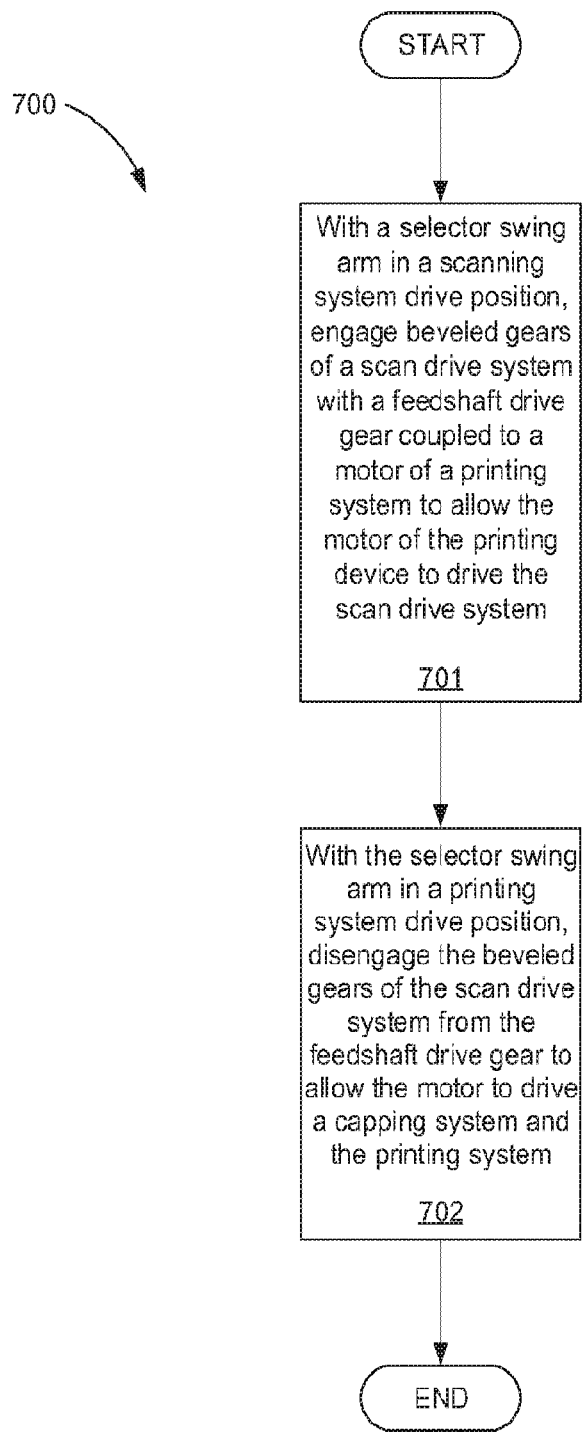
FIG. 7 is a flowchart a method for driving a selectable drive system of a printing device, according to one example of principles described herein.

FIG. 7 is a flowchart a method for driving a selectable drive system of a printing device (105), according to one example of principles described herein. The method (700) may be executed by the selectable drive system (100) and controlled by the controller (101). In this example, the method (700) includes with a selector swing arm in a scanning system drive position, engaging (block 701) bevel gears of a scan drive system with a feedshaft drive gear coupled to a motor of a printing system to allow the motor of the printing device (105) to drive the scan drive system. The method may further include, with the selector swing arm in an printing system drive position, disengaging (block 702) the bevel gears of the scan drive system from the feedshaft drive gear to allow the motor to drive a capping system and the printing system.

As mentioned above, the method (700) includes with a selector swing arm (140) in a scanning system drive position, engaging (block 701) bevel gears (128) of a scan drive system (160) with a feedshaft drive gear (120) coupled to a motor (114) of a printing system to allow the motor (114) of the printing device (105) system to drive the scan drive system (160). When the method (700) is driving the scan drive system (160), the method (700) has already finished driving the capping system (170). As a result, the method (700) can use the selectable drive system (100) for scanning purposes.

As mentioned above, the method (700) includes with the selector swing arm in a printing system drive position, disengaging (block 702) the bevel gears of the scan drive system (160) from the feedshaft drive gear to allow the motor to drive a capping system and the printing system. When the method (700) is not driving the scan drive system (160), the method (700) drives the capping system (170) and/or other printing system not associated with the scanning device (107) of the printing device (105). For example, the method (700) can drive the feedshaft (104) and the output shaft (102) such that they can drive the printing media through the printing device (105) and out of the printing device (105). As a result, the method (700) can use the selectable drive system (100) for capping and printing purposes. Since the selectable drive system (100) uses a single motor (114) instead of several motors, the width of the printing device (105) is reduced and the portability of the printing device (105) is increased.

The preceding description has been presented to illustrate and describe examples of the principles described. This description is not intended to be exhaustive or to limit these principles to any precise form disclosed. Many modifications and variations are possible in light of the above teaching.

What is claimed is:

1. A printing device comprising:
   a carriage slidably mounted on a carriage rail, the carriage to move along the carriage rail; and
   a selectable drive system comprising:
      a capping system to cap a number of pens coupled to the carriage;
      a scan drive system to drive components of a scanning device associated with the printing device;
      a drive selector assembly to select between driving the capping system to a uncapped position or driving the scan drive system depending on a position of a selector swing arm of the drive selector assembly; and
      a shifter to selectively shift the drive selector assembly between a scanning system drive position of the selector swing arm and a printing system drive position of the selector swing arm.

2. The printing device of claim 1, wherein the capping system comprises:
   a ramp to move a capping assembly in a vertical direction as the ramp moves in a horizontal direction, the capping assembly to cap the pens when the shifter is in a drive position and to uncap the pens when the shifter is in a clear position, the carriage to prevent the shifter from over rotating about a feedshaft when the shifter is in the drive position.

3. The printing device of claim 1, wherein the drive selector assembly comprises:
   a rack laterally movable based on a movement of a cluster gear rotatably coupled to feedshaft drive gear of a feedshaft; and
   the selector swing arm slidably connected to the rack via a connector arm coupling the selector swing arm to the rack, the selector swing arm pivoting to engage or disengage selector gears of the selector swing arm with a number of scan drive system gears of the scan drive system based on a position of the rack.

4. The printing device of claim 3, wherein the scan drive system comprise a set of bevel gears selectively coupled to the selector swing arm, a power take off (PTO) shaft coupled to the bevel gears, and a set of worm gears coupled to the PTO shaft.

5. The printing device of claim 4, wherein the bevel gears engage with a feedshaft drive gear of a feedshaft via the selector gears of the selector swing arm when the rack of the drive selector assembly is in a scan position.

6. The printing device of claim 4, wherein the bevel gears of the scan drive system disengage from a feedshaft drive gear of a feedshaft via the selector gears of selector swing arm when the rack is in an uncapped position.

7. A selectable drive system comprising:
a feedshaft;
a shifter rotatably coupled to the feedshaft, the shifter rotating between a clear position and a drive position based on a direction of rotation of the feedshaft, the shifter to selectively shift a drive selector assembly between a scanning system drive position of a selector swing arm and a printing system drive position of the selector swing arm;
a capping system to cap a number of pens coupled to the carriage;
a scan drive system to drive components of a scanning device associated with a printing device, the scan drive system comprising:
a set of bevel gears selectively coupled to the selector swing arm;
a power take off (PTO) shaft coupled to the bevel gears; and
a set of worm gears coupled to the PTO shaft; and a drive selector assembly to select between driving the capping system to a printing system drive position or driving the scan drive system depending on a position of a selector swing arm of the drive selector assembly.

8. The selectable drive system of claim 7, further comprising a motor wherein the motor is connected to the feedshaft to drive the selectable drive system.

9. The selectable drive system of claim 7, wherein the capping system moves in a vertical direction to cap or uncap the pens of the printing device.

10. The selectable drive system of claim 7, wherein the selectable drive system further comprises a friction device formed in the shifter to bias the shifter in a rotational direction of the feedshaft.

11. The selectable drive system of claim 7, wherein a carriage of a printing device interfaces with the shifter to prevent the shifter from over rotating.

12. The selectable drive system of claim 7, wherein the bevel gears engage with a feedshaft drive gear of the feedshaft via the selector gears of the selector swing arm when a rack of the drive selector assembly is in a scan position.

13. The system of claim 7, wherein the bevel gears of the scan drive system disengage from a feedshaft drive gear of the feedshaft via the selector gears of selector swing arm when a rack is in an uncapped position.

14. A method for driving a selectable drive system of a printing device, the method comprising:
with a selector swing arm in a scanning system drive position, engaging bevel gears of a scan drive system with a feedshaft drive gear coupled to a motor of a printing system to allow the motor of the printing device system to drive the scan drive system; and
with the selector swing arm in an printing system drive position, disengaging the bevel gears of the scan drive system from the feedshaft drive gear to allow the motor to drive a capping system and the printing system.

15. The method of claim 14, wherein a drive selector assembly selects between driving the capping system or the scan drive system depending on a position of a selector swing arm of the drive selector assembly.

* * * * *